(12) United States Patent
Huang

(10) Patent No.: US 11,816,494 B2
(45) Date of Patent: Nov. 14, 2023

(54) FOREGROUND ELEMENT DISPLAY METHOD AND ELECTRONIC DEVICE

(71) Applicant: HUAWEI TECHNOLOGIES CO., LTD., Shenzhen (CN)

(72) Inventor: Liwei Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 17/608,631

(22) PCT Filed: May 20, 2020

(86) PCT No.: PCT/CN2020/091275
§ 371 (c)(1),
(2) Date: Nov. 3, 2021

(87) PCT Pub. No.: WO2020/233593
PCT Pub. Date: Nov. 26, 2020

(65) Prior Publication Data
US 2022/0214892 A1    Jul. 7, 2022

(30) Foreign Application Priority Data
May 23, 2019    (CN) .......................... 201910432840.8

(51) Int. Cl.
*G06F 9/451*    (2018.01)
*G06F 3/048*    (2013.01)
(Continued)

(52) U.S. Cl.
CPC .............. *G06F 9/451* (2018.02); *G06T 5/002* (2013.01); *G06T 11/001* (2013.01); *G06T 2200/24* (2013.01)

(58) Field of Classification Search
CPC ........ G06F 9/451; G06F 3/048; G06F 3/0481; G06F 3/04812; G06F 3/04817;
(Continued)

(56) References Cited

U.S. PATENT DOCUMENTS 6,985,837 B2 *  1/2006  Moon ................... G06F 16/954
                                                              703/3
7,492,957 B1 *  2/2009  Bonhaus .............. G06V 10/754
                                                              375/240
(Continued)

FOREIGN PATENT DOCUMENTS

CN    105005461 A    10/2015
CN    105204807 A    12/2015
(Continued)

OTHER PUBLICATIONS

Itu-T, H.264 (Apr. 2017), Series H: Audiovisual and Multimedia Systems, Infrastructure of audiovisual services—Coding of moving video, Advanced video coding for generic audiovisual services, total 812 pages.

*Primary Examiner* — Wesner Sajous
(74) *Attorney, Agent, or Firm* — Maier & Maier, PLLC

(57) ABSTRACT

A display method and an electronic device. When a similarity between a foreground element and a background element is greater than or equal to a preset threshold, the electronic device obtains the foreground element, first performs complementary color processing on the obtained foreground element, then performs blur processing on a foreground element obtained after the complementary color processing, and finally performs fusion processing on a foreground element obtained after the blur processing and the original foreground element on which no processing is performed.

9 Claims, 31 Drawing Sheets

1000

```
┌─────────────────────────────────────────────────────┐
│ Display a first interface, where the first interface includes a first     │ 1001
│ foreground element and a first background element, and the first          │
│ foreground element has a first display effect                             │
└─────────────────────────────────────────────────────┘
                            │
                            ▼
┌─────────────────────────────────────────────────────┐
│ Receive a first operation of a user, and display a second interface,      │ 1002
│ where the second interface includes the first foreground element          │
│ and a second background element                                           │
└─────────────────────────────────────────────────────┘
```

(51) Int. Cl.

| | | |
|---|---|---|
| *G06T 5/00* | (2006.01) | |
| *G06T 11/00* | (2006.01) | |
| *G09G 5/02* | (2006.01) | |
| *G09G 5/30* | (2006.01) | |
| *G09G 5/37* | (2006.01) | |
| *H04N 5/57* | (2006.01) | |
| *H04N 1/60* | (2006.01) | |

(58) Field of Classification Search
CPC ............... G06F 3/0484; G06F 3/04842; G06F 3/04845; G06F 3/04847; G06T 5/002; G06T 5/003; G06T 5/006; G06T 7/00; G06T 2200/24; G06T 2207/00; G06T 2207/10024; G06T 11/001; H04N 1/58; H04N 1/60; H04N 1/6027; H04N 1/6077; H04N 5/57; G09G 5/02; G09G 5/026; G09G 5/04; G09G 5/14; G09G 5/30; G09G 5/373; G09G 5/377; G09G 5/391; G09G 5/26; G09G 5/28; G09G 2320/00; G09G 2320/02; G09G 2320/0233; G09G 2320/0242; G09G 2320/0271; G09G 2320/0276; G09G 2320/04; G09G 2320/06; G09G 2320/0613; G09G 2320/0626; G09G 2320/066; G09G 2320/0666

USPC ......................................................... 345/589

See application file for complete search history.

(56) References Cited

U.S. PATENT DOCUMENTS

| | | | |
|---|---|---|---|
| 10,979,761 B2* | 4/2021 | Sekar | ............... H04N 21/23418 |
| 2004/0145599 A1 | 7/2004 | Taoka et al. | |
| 2008/0106531 A1* | 5/2008 | Hullot | ............... H04M 1/72427 455/566 |
| 2016/0259497 A1* | 9/2016 | Foss | .................... G06F 3/04842 |
| 2018/0365849 A1* | 12/2018 | Taguchi | ................... G06T 7/571 |

FOREIGN PATENT DOCUMENTS

| | | | | |
|---|---|---|---|---|
| CN | 109189281 A | * | 1/2019 | ......... G06F 3/04817 |
| CN | 109189281 A | | 1/2019 | |
| CN | 110286975 A | | 9/2019 | |
| EP | 3276487 A1 | | 1/2018 | |
| JP | 2017138913 A | * | 8/2017 | ........... A63F 13/655 |

\* cited by examiner

CONT. FROM FIG. 4(a)

FOREGROUND ELEMENT DISPLAY METHOD AND ELECTRONIC DEVICE

This application is a National Stage of International Application No. PCT/CN2020/091275, filed on May 20, 2020, which claims priority to Chinese Patent Application No. 201910432840.8, filed on May 23, 2019, both of which are hereby incorporated by reference in their entireties.

TECHNICAL FIELD

The embodiments relate to the field of electronic technologies, and in particular, to a foreground element display method and an electronic device.

BACKGROUND

Currently, an electronic device plays an increasingly important role in people's life, and a user may obtain information such as time and a date by using the electronic device. When the user views the electronic device to obtain the information such as the time and the date, clear interface display is required to help the user quickly and accurately obtain the information.

An element displayed on an interface of the electronic device is affected by a background pattern. If a color of the element displayed on the interface of the electronic device is similar to a color of the background pattern, recognition of the element displayed on the interface is greatly affected.

SUMMARY

The embodiments provide a foreground element display method and an electronic device. The method can ensure that a foreground element has a clear display effect on an interface of the electronic device, ensure recognition of the foreground element, help a user obtain information, and improve user experience.

According to a first aspect, a foreground element display method is provided, applied to an electronic device. The method includes: displaying a first interface, where the first interface includes a first foreground element and a first background element, and the first foreground element has a first display effect; and receiving a first operation of a user, and displaying a second interface, where the second interface includes the first foreground element and a second background element; and when a similarity between the first foreground element and the second background element is greater than or equal to a first preset threshold, the first foreground element has a second display effect, and the first display effect is different from the second display effect; or when a similarity between the first foreground element and the second background element is less than a first preset threshold, the first foreground element has the first display effect.

For example, the first foreground element may be at least one of time, a date, weather information, an icon of an application, and a name of an application on the electronic device. A time element or a date element of the electronic device is used as an example. The first display effect may be a default display effect of the electronic device or a display effect that is set by the user, for example, a color, a font, or a size for displaying the time element or the date element.

For example, the first operation may be an operation of changing a wallpaper of the electronic device by the user. When the wallpaper of the electronic device is changed from the first background element to the second background element, the electronic device may detect the similarity between the first foreground element and the second background element.

For example, the second display effect may add a black shadow effect around the foreground element such as the time or the date. For example, when the similarity between the first foreground element and the second background element is greater than or equal to a first preset threshold, complementary color processing is performed on the first foreground element, where the complementary color processing is used to change a color of the first foreground element. In this way, a similarity between the color of the first foreground element and a color of the second background element is less than or equal to the first preset threshold. Then, blur processing is performed on the first foreground element on which the complementary color processing is performed, and the first foreground element on which the blur processing is performed and the first foreground element on which no processing is performed are fused, to obtain the first foreground element having the second display effect.

In a possible implementation, the fuzzing processing is used to obtain the first foreground elements with different blur degrees. For example, in a process of determining a blur degree, after the first foreground element and the first foreground elements on which blur processing with different blur degrees is performed are fused, the similarity between the first foreground element and the second background element is detected until the similarity between the first foreground element and the second background element is less than the first preset threshold.

In the foreground element display method described above, when the similarity between the foreground element and the background picture is high, the foreground element is extracted, the complementary color processing is performed on the extracted foreground element, and the blur processing is performed on the foreground element obtained after the complementary color processing. Then, the foreground element obtained after the blur processing and an original foreground element on which no processing is performed are superimposed, so that the foreground element has a clear display effect on the background picture, to ensure recognition of the foreground element and make the display effect natural. In addition, the background can be dynamically processed in real time following the change of the foreground element. In this way, an effect of the background picture is not affected. The display effect of the foreground element is natural, and the foreground element can be clearly displayed in any background pattern.

With reference to the first aspect, in some implementations of the first aspect, the method further includes: receiving a second operation of the user, and displaying a third interface, where the third interface includes a second foreground element and the first background element; and when a similarity between the second foreground element and the first background element is greater than or equal to the first preset threshold, the second foreground element has the second display effect; or when a similarity between the second foreground element and the first background element is less than the first preset threshold, the second foreground element has the first display effect.

For example, the second operation may be an operation of changing display of the foreground element of the electronic device by the user, for example, changing the font of the time element or the date element of the electronic device to the English font, that is, changing from the first foreground element to the second foreground element. When the wallpaper of the electronic device does not change, the electronic device may detect the similarity between the second foreground element and the first background element.

With reference to the first aspect and the foregoing implementations, in some implementations of the first aspect, the first background element and the second background element are wallpapers of the electronic device in a screen-locked state or wallpapers of the electronic device in a screen-unlocked state.

With reference to the first aspect and the foregoing implementations, in some implementations of the first aspect, the first foreground element and the second foreground element each are at least one of time, a date, weather information, an icon of an application, and a name of an application.

It should be understood that when the user changes the wallpaper of the electronic device, or changes display of a font or a language setting of a foreground element, such as time or a date, the electronic device starts detection to determine the similarity between the foreground element and the background pattern. Impact of the background pattern on the foreground element changes. In this case, the electronic device may start detection to re-determine a similarity between the foreground element and the background pattern. Only when the similarity between the foreground element and the background pattern is high, the foreground element display method provided in the embodiments is used.

In addition, when the electronic device is in a screen-locked state, the background pattern is a lock screen pattern. The lock screen pattern of the electronic device may be set to a continuously changing state. For example, if the user presses a power button once but does not unlock the electronic device, the lock screen pattern changes once. In this scenario, the electronic device may start detection by pressing the power button by the user, and determine the similarity between the foreground element and the background pattern. Alternatively, the user may trigger the change of the lock screen pattern in another manner. As long as a change of the background element is detected, the electronic device may start detection to determine the similarity between the foreground element and the background pattern. A manner of triggering the change of the lock screen pattern is not limited in the embodiments.

When the electronic device detects that the foreground element differs greatly from the background pattern, the electronic device does not need to use the method provided in this embodiment of the embodiments. For example, the electronic device may detect the similarity between a color of the foreground element and a color of the background pattern, or a contrast between a color of the foreground element and a color of the background pattern. When the similarity between the color of the foreground element and the color of the background pattern is greater than a specific threshold, or when the contrast between the color of the foreground element and the color of the background pattern is less than a specific threshold, it may be determined that the background pattern affects display of the foreground element, and the foreground element may be processed by using the foreground element processing method provided in the embodiments.

According to a second aspect, an electronic device is provided, including one or more processors, one or more memories, a plurality of applications, and one or more programs, where the one or more programs are stored in the memory, and when the one or more programs are executed by the processor, the electronic device is enabled to perform the following steps: displaying a first interface, where the first interface includes a first foreground element and a first background element, and the first foreground element has a first display effect; and receiving a first operation of a user, and displaying a second interface, where the second interface includes the first foreground element and a second background element; and when a similarity between the first foreground element and the second background element is greater than or equal to a first preset threshold, the first foreground element has a second display effect, and the first display effect is different from the second display effect; or when a similarity between the first foreground element and the second background element is less than a first preset threshold, the first foreground element has the first display effect.

With reference to the second aspect, in some implementations of the second aspect, when the one or more programs are executed by the processor, the electronic device is enabled to perform the following steps: receiving a second operation of the user, and displaying a third interface, where the third interface includes a second foreground element and the first background element; and when a similarity between the second foreground element and the first background element is greater than or equal to the first preset threshold, the second foreground element has the second display effect; or when a similarity between the second foreground element and the first background element is less than the first preset threshold, the second foreground element has the first display effect.

With reference to the second aspect and the foregoing implementations, in some implementations of the second aspect, the first background element and the second background element are wallpapers of the electronic device in a screen-locked state or wallpapers of the electronic device in a screen-unlocked state.

With reference to the second aspect and the foregoing implementations, in some implementations of the second aspect, the first foreground element and the second foreground element each are at least one of time, a date, weather, an icon of an application, and a name of an application.

According to a third aspect, the embodiments provide an apparatus. The apparatus is included in an electronic device, and the apparatus has a function of implementing behavior of the electronic device in the foregoing aspects and the possible implementations of the foregoing aspects. The function may be implemented by hardware, or may be implemented by hardware by executing corresponding software. The hardware or the software includes one or more modules or units corresponding to the foregoing function, for example, a display module or unit, or a processing module or unit.

According to a fourth aspect, the embodiments provide an electronic device, including a display screen, a camera, one or more processors, a memory, a plurality of applications, and one or more computer programs, where the display screen includes a touch-sensitive surface and a display. The one or more computer programs are stored in the memory, and the one or more computer programs include instructions. When the instructions are executed by the electronic device, the electronic device is enabled to perform the foreground element display method according to any possible implementation of any one of the foregoing aspects.

According to a fifth aspect, the embodiments provide an electronic device, including one or more processors and one or more memories. The one or more memories are coupled to the one or more processors, the one or more memories are configured to store computer program code, and the computer program code includes computer instructions. When the one or more processors execute the computer instructions, the electronic device is enabled to perform the foreground element display method according to any possible implementation of any one of the foregoing aspects.

According to a sixth aspect, the embodiments provide a computer storage medium, including computer instructions. When the computer instructions are run on an electronic device, the electronic device is enabled to perform the foreground element display method according to any possible implementation of any one of the foregoing aspects.

According to a seventh aspect, the embodiments provide a computer program product. When the computer program product is run on an electronic device, the electronic device is enabled to perform the foreground element display method according to any possible implementation of any one of the foregoing aspects.

DETAILED DESCRIPTION OF THE EMBODIMENTS

The following describes the solutions in the embodiments with reference to the accompanying drawings.

In the descriptions of the embodiments, unless otherwise specified, "/" means "or". For example, A/B may represent A or B. In the embodiments, "and/or" describes only an association for describing associated objects and represents that three relationships may exist. For example, A and/or B may represent the following three cases: only A exists, both A and B exist, and only B exists. In addition, in the descriptions in the embodiments, "a plurality of" means two or more than two.

The following terms "first" and "second" are only intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

As described in the Background, an element displayed on an interface of an electronic device is affected by a background pattern. Particularly, when a color of the element displayed on the interface of the electronic device is similar to a color of the background pattern, recognition of the element displayed on the interface is greatly affected. It is inconvenient for a user to quickly and accurately obtain information included in the element on the interface.

An embodiment provides a foreground element display method, which may be applied to an electronic device. When a color of an element displayed on an interface of the electronic device is similar to a color of a background pattern, a series of processing processes may be performed on the element displayed on the interface, so that the element displayed on the interface has a natural display effect, and an effect of the background picture is not affected. This ensures that the element displayed on the interface can be clearly displayed in any background pattern.

The foreground element display method provided in this embodiment may be applied to electronic devices such as a mobile phone, a tablet computer, a wearable device, a vehicle-mounted device, an augmented reality (AR)/virtual reality (VR) device, a notebook computer, an ultra-mobile personal computer (UMPC), a netbook, and a personal digital assistant (PDA). A specific type of the electronic device is not limited in this embodiment.

Figure 1:
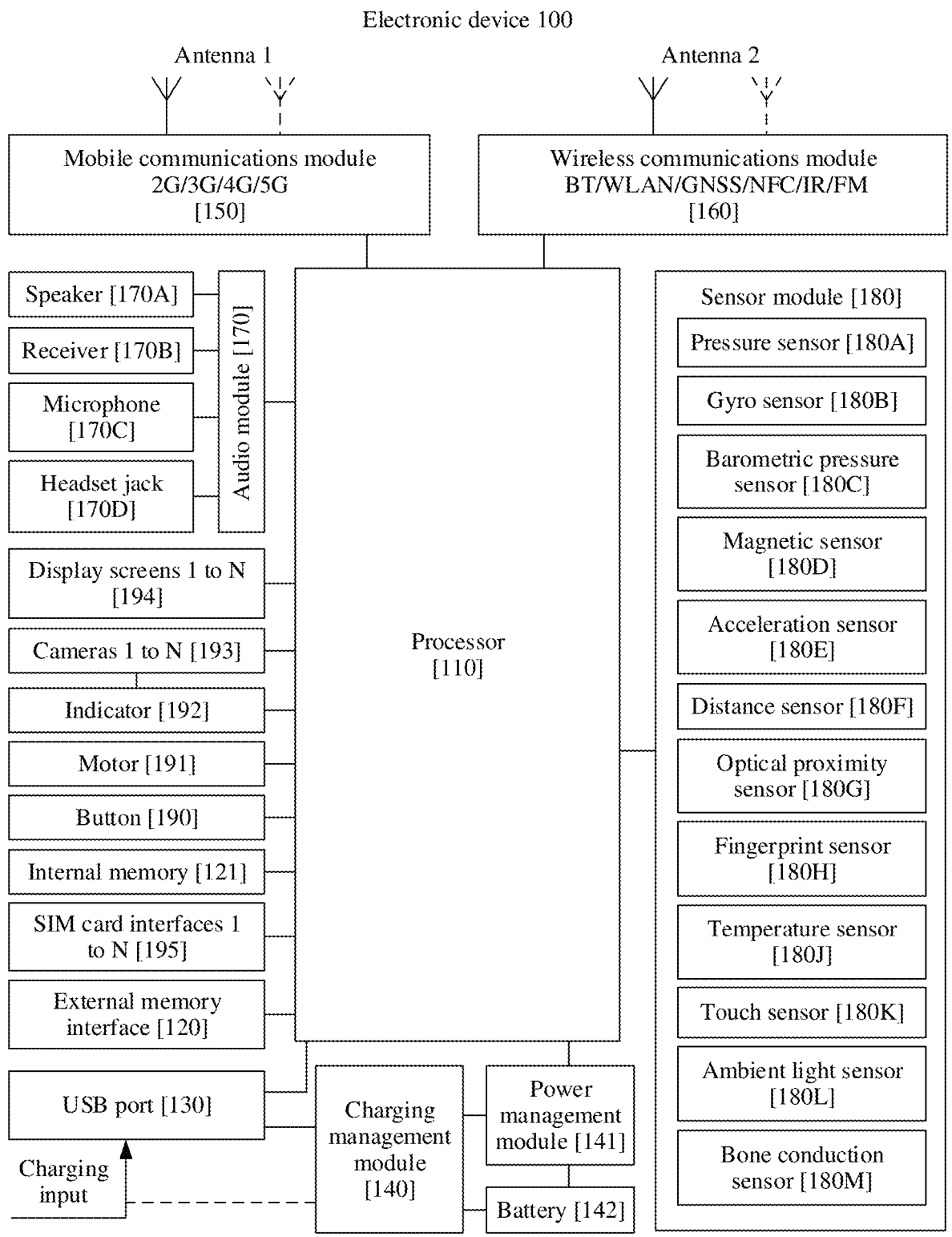
FIG. 1 is a schematic diagram of a hardware structure of an electronic device according to an embodiment.

For example, FIG. 1 is a schematic diagram of a structure of an electronic device 100. The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

The memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. Repeated access is avoided, and waiting time of the processor 110 is reduced, and therefore system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB port, and/or the like.

For example, in the embodiments, the processor detects a similarity between a foreground element and a background picture by obtaining information about the foreground element and the background picture, and when the similarity between the foreground element and the background picture is greater than or equal to a preset threshold, performs a series of processing operations on the foreground element. Therefore, the foreground element can have a clear display effect on the background picture, and the user can conveniently obtain information about the foreground element.

The I2C interface is a bidirectional synchronous serial bus and includes a serial data line (SDA) and a serial clock line ( ). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using an I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication to sample, quantize, and encode an analog signal. In some embodiments, the audio module 170 and the wireless communications module 160 may be coupled through a PCM bus interface. In some embodiments, the audio module 170 may also transmit an audio signal to the wireless communications module 160 through the PCM interface, to implement a function of answering a call by using the Bluetooth headset. Both the I2S interface and the PCM interface may be used for audio communication.

The UART interface is a universal serial data bus, and is used for asynchronous communication. The bus may be a bidirectional communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI interface may be configured to connect the processor 110 to a peripheral component such as the display screen 194 or the camera 193. The MIPI interface includes a camera serial interface (CSI), a display serial interface (DSI), or the like. In some embodiments, the processor 110 communicates with the camera 193 through the CSI interface, to implement a photographing function of the electronic device 100. The processor 110 communicates with the display screen 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display screen 194, the wireless communications module 160, the audio module 170, the sensor module 180, and the like. The GPIO interface may alternatively be configured as the I2C interface, the I2S interface, the UART interface, the MIPI interface, or the like.

The USB port 130 is a port that complies with a USB standard specification and may be a mini USB port, a micro USB port, a USB Type C port, or the like. The USB port 130 may be configured to connect to the charger to charge the electronic device 100, or may be used for data transmission between the electronic device 100 and a peripheral device, or may be configured to connect to a headset to play audio through the headset. This interface may be further configured to connect to another electronic device such as an AR device.

It can be understood that an interface connection relationship between modules illustrated in this embodiment is merely an example for description and does not constitute a limitation on the structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, an antenna may be used in combination with a tuning switch.

The mobile communications module 150 can provide a solution, applied to the electronic device 100, to wireless communication including 2G/3G/4G/5G and the like. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 170A, the receiver 170B, or the like), or displays an image or a video through the display screen 194. In some embodiments, the modem processor may be an independent component. In some other embodiments, the modem processor may be independent of the processor 110, and is disposed in a same device as the mobile communications module 150 or another function module.

The wireless communications module 160 may provide wireless communication solutions, applied to the electronic device 100, for example, wireless local area network (WLAN) (such as a wireless fidelity (Wi-Fi) network), Bluetooth (BT), global navigation satellite system (GNSS), frequency modulation (FM), near field communication (NFC), and infrared (IR) technologies. The wireless communications module 160 may be one or more components integrating at least one communications processor module. The wireless communications module 160 receives an electromagnetic wave by using the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, convert the signal into an electromagnetic wave by using the antenna 2, and radiate the electromagnetic wave by using the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (time-division code division multiple access, TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and render an image. The processor 110 may include one or more GPUs that execute program instructions to generate or change display information.

The display screen 194 is configured to display an image, a video, or the like. The display screen 194 includes a display panel. The display panel may use a liquid crystal display (LCD), an organic light-emitting diode (OLED), an active-matrix organic light-emitting diode or an active-matrix organic light-emitting diode (AMOLED), a flex light-emitting diode (FLED), a mini-LED, a micro-LED, a micro-OLED, quantum dot light-emitting diodes (QLED), or the like. In some embodiments, the electronic device 100 may include one or N display screens 194, where N is a positive integer greater than 1.

For example, in the embodiments, the display screen may be configured to display the background picture and the foreground element.

The electronic device 100 can implement the photographing function by using the ISP, the camera 193, the video codec, the GPU, the display screen 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

For example, in the foreground element display method provided in the embodiments, the camera may collect the moon and the background picture and display the collected images on a preview interface. The photosensitive element converts a collected optical signal into an electrical signal, and then transmits the electrical signal to the ISP to convert the electrical signal into a digital image signal. The ISP outputs the digital image signal to the DSP for related image processing.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more types of video codecs. In this way, the electronic device 100 can play or record videos in a plurality of encoding formats, for example, moving picture experts group (MPEG)-1, MPEG-2, MPEG-3, and MPEG-4.

The NPU is a neural network (NN) computing processor. The NPU quickly processes input information with reference to a structure of a biological neural network, for example, with reference to a transfer mode between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121 to perform various function applications of the electronic device 100 and process data. The internal memory 121 may include a program storage area and a data storage area. The program storage area may store an operating system, an application required by at least one function (for example, a sound playing function or an image playing function), and the like. The data storage area may store data (such as audio data and a phone book) and the like created when the electronic device 100 is used. In addition, the internal memory 121 may include a high-speed random access memory, and may further include a nonvolatile memory, for example, at least one magnetic disk storage device, a flash memory device, or a universal flash storage (UFS).

The electronic device 100 may implement audio functions by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal output, and is further configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to receive a voice.

The microphone 170C, also referred to as a "mike" or a "voice tube", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal and reduce noise. The microphones may further identify a sound source, to implement a directional recording function, and the like.

The headset jack 170D is configured to connect to a wired headset. The headset jack 170D may be the USB port 130, or may be a 3.5 mm open mobile electronic device platform (OMTP) standard interface, or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change of the capacitance. When a touch operation is performed on the display screen 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensities may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating an SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to perform image stabilization during photographing. For example, when the shutter is pressed, the gyro sensor 180B detects a shaking angle of the electronic device 100, calculates, based on the angle, a distance for which a lens module needs to compensate, and allows the lens to eliminate the shaking of the electronic device 100 through reverse motion, to implement image stabilization. The gyro sensor 180B may also be used in navigation and motion sensing game scenarios.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect magnitude of accelerations of the electronic device 100 in all directions (usually on three axes), and may detect magnitude and a direction of gravity when the electronic device 100 is still. The acceleration sensor 180E may further be configured to identify a posture of the electronic device, and is applied to switching between a landscape mode and a portrait mode, and applications such as a pedometer.

The distance sensor 180F is configured to measure a distance. The electronic device 100 may measure a distance by using infrared or laser. In some embodiments, in a photographing scenario, the electronic device 100 may measure a distance by using the distance sensor 180F, to implement fast focusing.

For example, in the foreground element display method provided in the embodiments, in a photographing preview phase, a distance may be measured in an auto-focus process based on the distance sensor 180F, to implement fast auto-focus.

The optical proximity sensor 180G may include, for example, a light-emitting diode (LED) and an optical detector, such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock a screen in a leather case mode and a pocket mode.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust white balance during shooting. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application access locking, fingerprint-based shooting, fingerprint-based call answering, and the like by using a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is lower than another threshold, the electronic device 100 heats up the battery 142, to avoid abnormal shutdown of the electronic device 100 due to a low temperature. In some other embodiments, when the temperature is lower than still another threshold, the electronic device 100 boosts an output voltage of the battery 142, to avoid abnormal shutdown due to a low temperature.

The touch sensor 180K is also referred to as a "touch panel". The touch sensor 180K may be disposed on the display screen 194, and the touch sensor 180K and the display screen 194 form a touchscreen that is also referred to as a "touch control screen". The touch sensor 180K is configured to detect a touch operation performed on or near the touch sensor 180K. The touch sensor may transfer the detected touch operation to the application processor, to determine a type of a touch event. A visual output related to the touch operation may be provided by using the display screen 194. In some other embodiments, the touch sensor 180K may alternatively be disposed on a surface of the electronic device 100, and is located at a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display screen 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards can be simultaneously inserted into the same SIM card interface 195. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communications. In some embodiments, the electronic device 100 uses an eSIM, namely, an embedded SIM card. The eSIM card may be embedded in the electronic device 100, and cannot be separated from the electronic device 100.

A software system of the electronic device 100 may use a hierarchical architecture, an event-driven architecture, a microkernel architecture, a microservice architecture, or a cloud architecture. In the embodiments, an Android system with a layered architecture is used as an example to describe a software structure of the electronic device 100.

Figure 2:
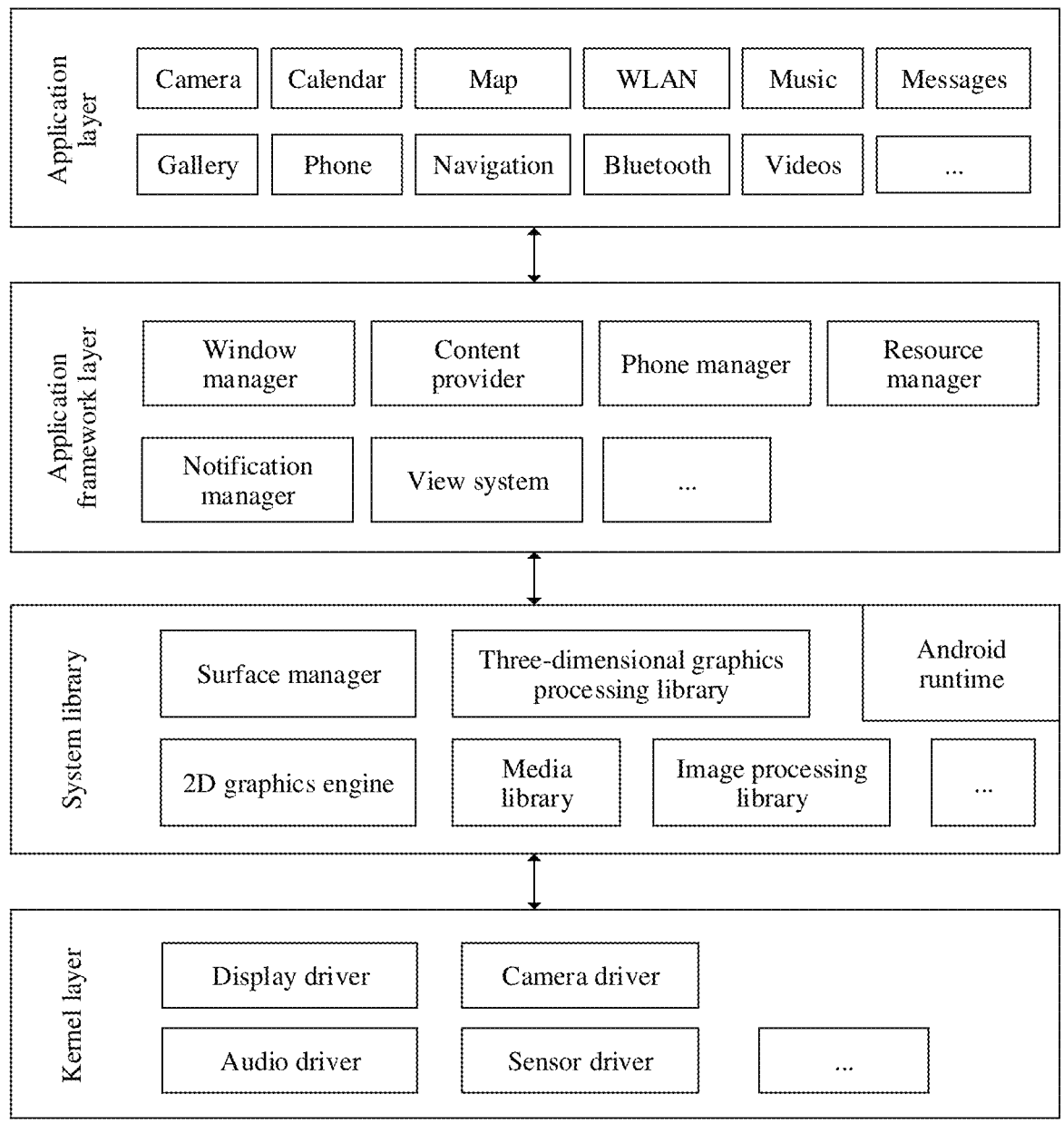
FIG. 2 is a schematic diagram of a software structure of an electronic device according to an embodiment.

FIG. 2 is a block diagram of the software structure of the electronic device 100 according to this embodiment. In a hierarchical architecture, software is divided into several layers, and each layer has a clear role and responsibility. The layers communicate with each other through a software interface. In some embodiments, an Android system is divided into four layers, namely, an application layer, an application framework layer, an Android runtime, a system library, and a kernel layer from top to bottom. The application layer may include a series of application packages.

As shown in FIG. 2, the application packages may include applications such as "camera", "gallery", "calendar", "phone", "map", "navigation", "WLAN", "Bluetooth", "music", "videos", and "messages".

The application framework layer provides an application programming interface (API) and a programming framework for an application at the application layer. The application framework layer includes some predefined functions.

For example, in the embodiments, an algorithm for performing a series of processing on the obtained foreground element may be included at the application framework layer.

As shown in FIG. 2, the application framework layer may include a window manager, a content provider, a view system, a phone manager, a resource manager, a notification manager, and the like.

The window manager is configured to manage a window program. The window manager may obtain a size of the display screen, determine whether there is a status bar, perform screen locking, take a screenshot, and the like.

The content provider is configured to store and obtain data, and enable the data to be accessed by an application. The data may include a video, an image, audio, dialed and answered calls, browsing history, a bookmark, a phone book, and the like.

For example, in the embodiments, a content controller may obtain information about the foreground element and the background picture in a preview interface in real time and display the processed foreground element in the interface.

The view system includes a visual control, for example, a control for displaying text or a control for displaying a picture. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, and the like).

The resource manager provides, for an application, various resources such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, a prompt tone is produced, the electronic device vibrates, or an indicator light blinks.

The Android runtime includes a kernel library and a virtual machine. The Android runtime is responsible for scheduling and management of the Android system.

The kernel library includes two parts: One part is a performance function that the Java language needs to schedule, and the other part is a kernel library of Android.

The application layer and the application framework layer run in the virtual machine. The virtual machine executes Java files at the application layer and the application framework layer as binary files. The virtual machine is configured to perform functions such as object life cycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem, and provides fusion of 2D and 3D layers for a plurality of applications.

The media library supports playback and recording of a plurality of common audio and video formats, a static image file, and the like. The media library may support a plurality of audio and video encoding formats such as MPEG-4, H.264, MP3, AAC, AMR, JPG, and PNG.

The three-dimensional graphics processing library is used to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments, the electronic device having the structures shown in FIG. 1 and FIG. 2 is used as an example to describe in detail, with reference to the accompanying drawings and application scenarios, the foreground element display method provided in the embodiments.

An element displayed on an interface of the electronic device is affected by a background pattern on the interface. If a color of the element displayed on the interface of the electronic device is similar to a color of the background pattern, recognition of the element displayed on the interface is greatly affected.

It should be understood that the element displayed on the interface of the electronic device may include one or more of time, a date, a day, and weather; or the element displayed on the interface may be a widget display box that includes time, a date, a day, weather, and a trip; or the element displayed on the interface may include names of icons of various third-party applications, for example, icons or names of applications such as Alipay and WeChat; or the element displayed on the interface may include an icon, a name, and the like of a folder created by a user. This is not limited in the embodiments. In the embodiments, the element displayed on the interface is referred to as a "foreground element", and a pattern in a wallpaper (for example, a home screen wallpaper in a screen-unlocked state or a lock screen wallpaper in a screen-locked state) of the electronic device is referred to as a "background pattern". The time, the date, the day, or the like displayed on the interface of the electronic device is used as the foreground element to describe the foreground element display method.

Figure 3A:
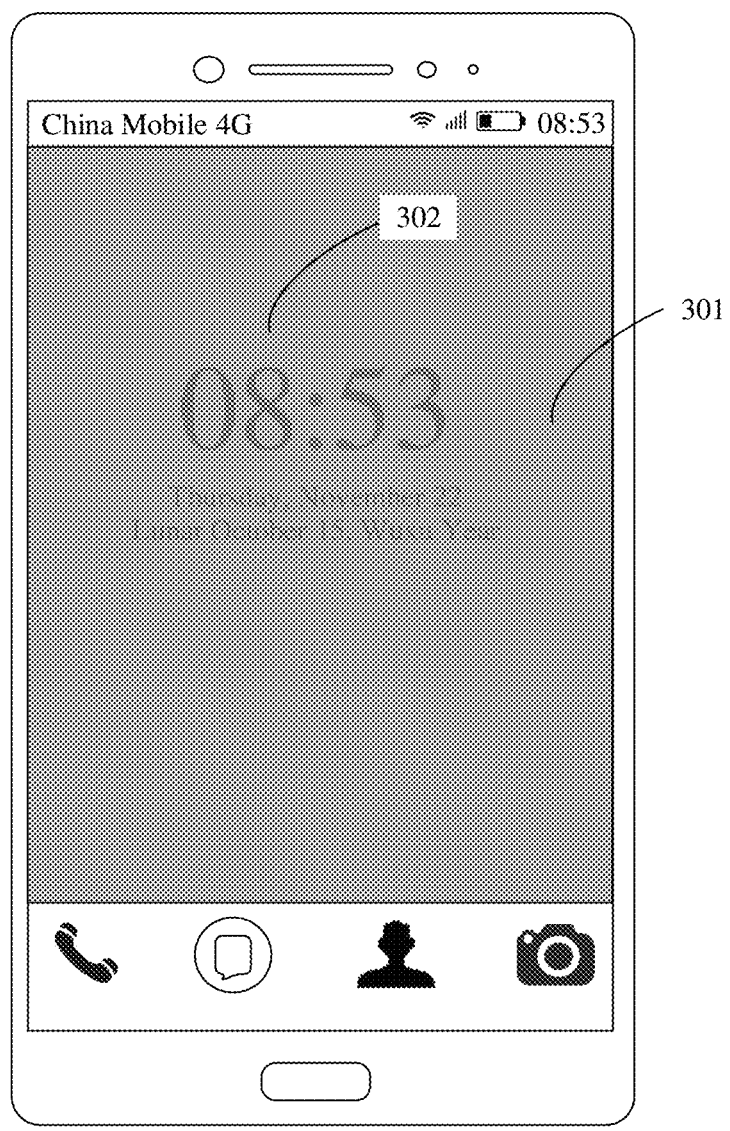
FIG. 3(a), FIG. 3(b), FIG. 3(c), and FIG. 3(d) are a schematic diagram of an example of displaying a foreground element of an electronic device according to an embodiment.

FIG. 3(a), FIG. 3(b), FIG. 3(c), and FIG. 3(d) are a schematic diagram of an example of displaying a foreground element of an electronic device. As shown in FIG. 3(a), on a display interface of the electronic device, a background pattern 301 is a pattern in a background wallpaper of the display interface, and a foreground element 302 is time, a date, a day, or the like that is displayed on the background pattern in the display interface.

As shown in FIG. 3(a), when a color of the background pattern 301 and a color of the foreground element 302 are similar, recognition of the foreground element 302 is affected. When a user views information such as time, a date, a day, or weather, because the color of the background pattern 301 and the color of the foreground element 302 are similar, the user cannot clearly see or accurately obtain required information; or a pattern in the background pattern 301 may affect a number, a character, or the like in the foreground element 302, and consequently, the user incorrectly reads the time, the date, the day, or the like.

To improve recognition of the foreground element, the following methods may be used.

Figure 3B:

In an implementation, a projection is added at the bottom of the foreground element, to improve the recognition of the foreground element. As shown in FIG. 3(b), a projection is added at the bottom of the time, the date, or the day displayed on the interface, and the recognition is enhanced. However, the projection is stiff, and consequently, display of the time, the date, or the day is blurred, and a visual effect is poor.

Figure 3C:

In another implementation, complementary color processing is performed on the foreground element. As shown in FIG. 3(c), the time, the date, or the day displayed on the original interface is in black font, and the foreground element such as the time, the date, or the day is displayed in white font after complementary color processing is performed. This method is applicable to a case in which a color in the background pattern is relatively pure. If the background pattern is a black-and-white pattern, because the foreground element is displayed as black, and is displayed as white after complementary color processing is performed, the foreground element may still be indistinguishable from the background pattern, and there is still a problem in recognition.

It should be understood that, complementary color processing may be completed by a system of a terminal device in real time, for example, when the color of the foreground element and the color of the background pattern are similar, complementary color processing is performed on the foreground element. Alternatively, complementary color processing is completed in advance by a vendor of a third-party application that provides the foreground element, the foreground element is stored in a terminal device in a specific form, and when the color of the foreground element and the color of the background pattern are similar, the terminal device invokes the foreground element stored in the terminal device for display. This is not limited in the embodiments.

Figure 3D:
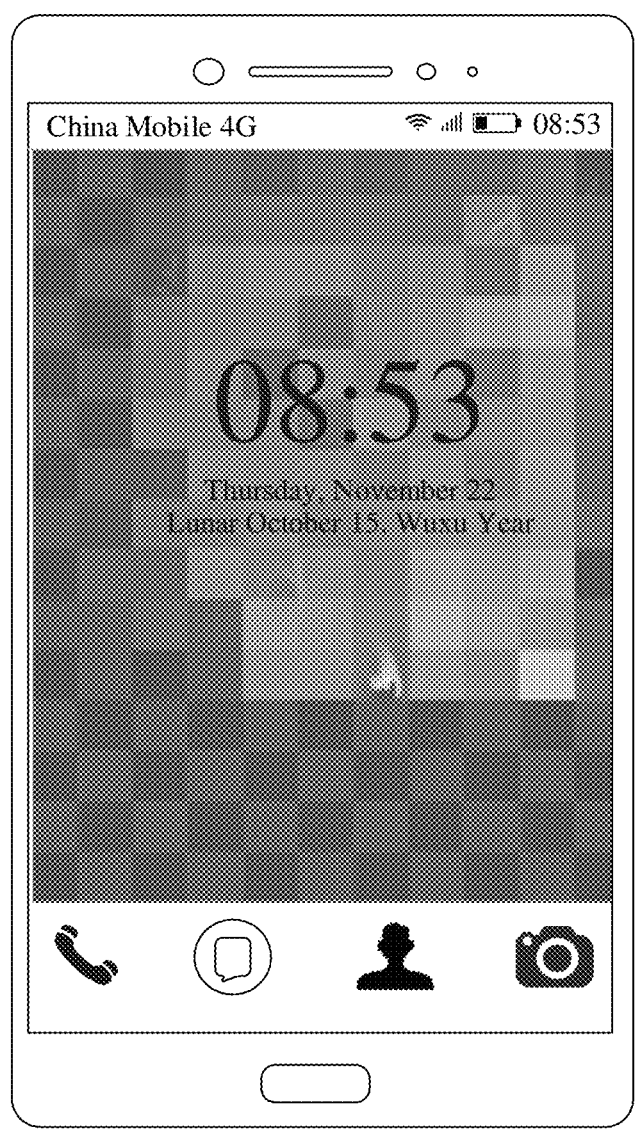
Figure 4A:
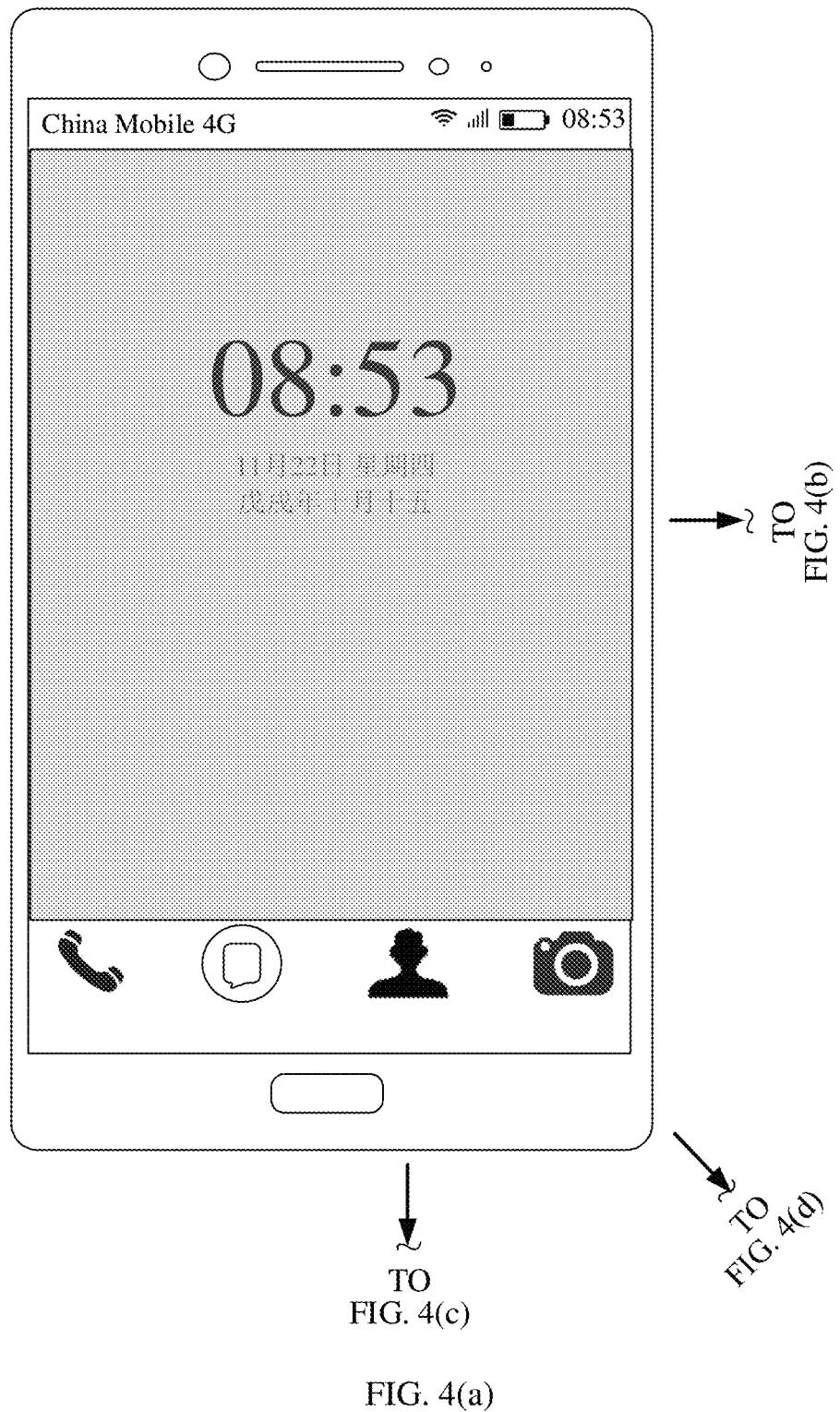
FIG. 4(a), FIG. 4(b), FIG. 4(c), and FIG. 4(d) are a schematic diagram of several scenario examples according to an embodiment.
Figure 4B:
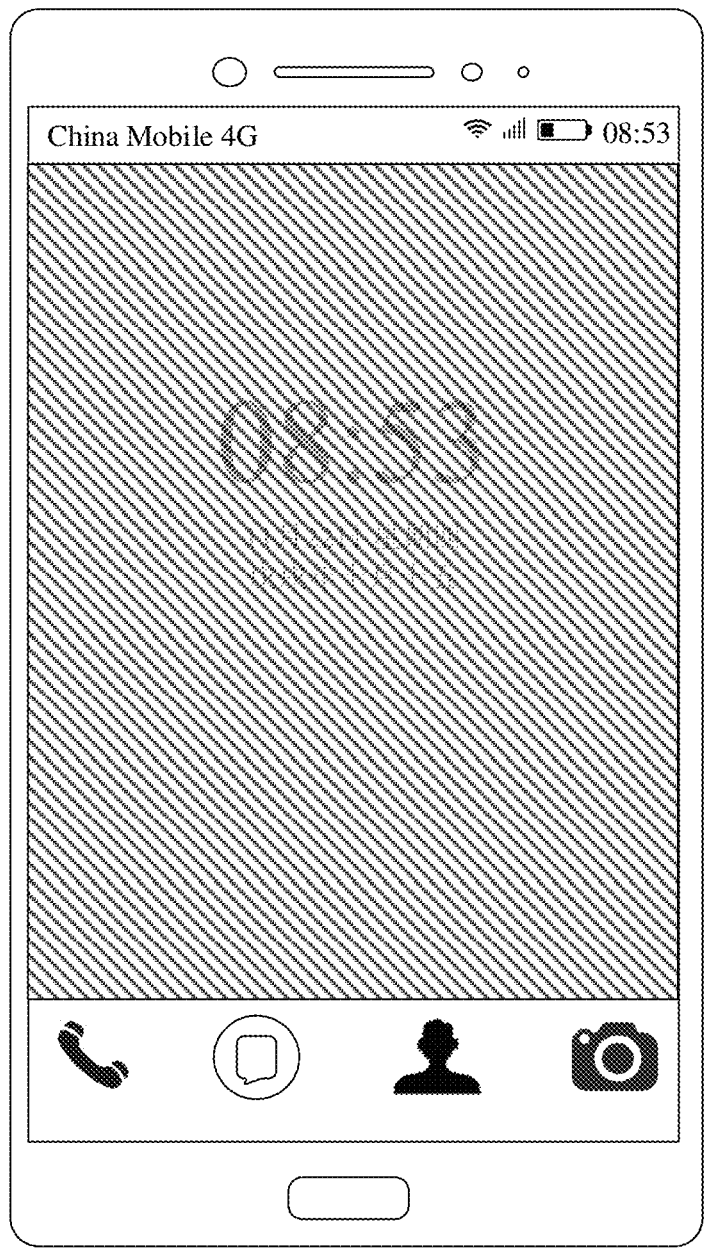
Figure 4C:
Figure 4D:

In another implementation, the background pattern is processed, to enhance the recognition of the foreground element, for example, blur processing may be performed on the background pattern. As shown in FIG. 3(d), blur processing on the background pattern may improve the recognition of the foreground element. However, in actual use, after the background pattern is blurred, the user cannot clearly see the actual background pattern. When the background pattern after the blur processing is a lock screen wallpaper of the electronic device, if the user prefers to present a picture effect by using the lock screen wallpaper, this method cannot achieve an effect of enhancing the recognition of the foreground element.

In another implementation, a mask layer is added between the background pattern and the foreground element, to enhance the recognition of the foreground element. For example, a translucent and gradually-changed white or black mask layer may be added between the foreground element and the background pattern, so that the recognition of the foreground element can be enhanced without affecting the foreground element. However, this method is similar to the method in FIG. 3(d), and both affect display of the background pattern.

Before the foreground element display method is described, in a possible implementation, the electronic device may first detect whether the foreground element display method provided in the embodiments needs to be used in a current scenario. For example, the electronic device may automatically detect a similarity between the foreground element and the background pattern. The foreground element display method provided in the embodiments is used only when the similarity between the foreground element and the background pattern is high. This solution does not need to be used if the foreground element and the background pattern are very different.

In another possible implementation, the electronic device may not detect a similarity between the foreground element and the background pattern and perform display by using the foreground element display method provided in the embodiments, to reduce performance consumption of the terminal device. This is not limited in the embodiments.

It should be understood that the similarity between the foreground element and the background pattern may be a difference between a color of a first area in which the foreground element is displayed and a color of a second area corresponding to the first area in the background pattern. When the color difference is less than or equal to a preset threshold, the electronic device determines that the background pattern may affect display of the foreground element, and the foreground element display method provided in the embodiments may be used to ensure the recognition of the foreground element. It should be further understood that a range of the first area in which the foreground element is displayed may be less than or equal to a range of the second area in the background pattern. This is not limited in the embodiments.

FIG. 4(*a*), FIG. 4(*b*), FIG. 4(*c*), and FIG. 4(*d*) are a schematic diagram of several scenario examples according to an embodiment.

For example, when a user changes a background pattern, an electronic device may detect a similarity between a foreground element and the background pattern. FIG. 4(*a*) shows display of an original background pattern and the foreground element of the electronic device. The user replaces the original background pattern with a background pattern shown in FIG. 4(*b*). When the background pattern changes, the electronic device may detect a similarity between the foreground element and the background pattern, to determine whether to process the foreground element.

It should be understood that colors of different parts in the background pattern may be different, and patterns in the background pattern may be located in different display areas. When the background pattern changes, the colors in the background pattern, shapes in the patterns, and the display areas may change, and impact on the foreground element may also change. In this case, the electronic device detects the similarity between the foreground element and the background pattern, determines the similarity between the foreground element and the background pattern, and uses the foreground element display method provided in the embodiments only when the similarity between the foreground element and the background pattern is high.

It should be understood that, in the embodiments, the electronic device determines, by determining the similarity between the foreground element and the background pattern, whether to process the foreground element by using the foreground element processing method provided in the embodiments.

Optionally, the electronic device may further determine a contrast between a color of the foreground element and a color of the background pattern, and this may be understood as determining a similarity between the color of the foreground element and the color of the background pattern. It should be understood that, that the electronic device determines the contrast between the foreground element and the background pattern may be determining a difference between a color of a first area in which the foreground element is displayed and a color of a second area corresponding to the first area in the background pattern, where a range of the first area may be less than or equal to a range of the second area. This is not limited in the embodiments.

For example, when the contrast between the color of the foreground element and the color of the background pattern is relatively high, it indicates that the difference between the color of the foreground element and the color of the background pattern is relatively large; or when the contrast between the color of the foreground element and the color of the background pattern is relatively low, it indicates that the color of the foreground element and the color of the background pattern are similar. Alternatively, the electronic device may determine both the similarity and contrast between the color of the foreground element and the color of the background pattern. In the description of this embodiment, an example in which the electronic device determines the similarity between the color of the foreground element and the color of the background pattern is used for description. This is not limited in the embodiments. For example, based on a contrast 4.6:1 of a visible color of an ordinary person, when the contrast between the color of the foreground element and the color of the background pattern is greater than 4.6, the electronic device determines that the user can clearly see the foreground element currently, that is, can obtain information included in the foreground element, for example, clearly obtain information such as time, a date, or a day. This is not limited in the embodiments.

It should be further understood that, when determining the similarity or the contrast between the foreground element and the background pattern, the electronic device in the embodiments may separately detect a similarity or a contrast between each element and the background pattern. For example, for "08:53", the electronic device may separately detect a similarity or a contrast between each element in "0", "8", "5", and "3" and the background pattern. When only a similarity between "8" and the background pattern is greater than a preset threshold, "8" is processed by using the foreground element display method provided in the embodiments, so that the user can clearly recognize "8".

Alternatively, when the user switches a language of the electronic device, the electronic device starts detection to determine the similarity between the foreground element and the background pattern. FIG. 4(*a*) shows a foreground element such as time, a date, or a day displayed when the language is set to simplified Chinese. When the user switches to another language, for example, when the language setting is switched from simplified Chinese to English, Japanese, or another minority language, the foreground element may change. For example, a display area of the time, the date, or the day may become larger or smaller, and impact of the background pattern on the foreground element changes. In this case, the electronic device may start detection to re-determine a similarity between the foreground element and the background pattern. Only when the similarity between the foreground element and the background pattern is high, the foreground element display method provided in the embodiments is used.

Alternatively, as shown in FIG. 4(*d*), when the electronic device is in a screen-locked state, the background pattern is a lock screen pattern. The lock screen pattern of the electronic device may be set to a continuously changing state. For example, if the user presses a power button once but does not unlock the electronic device, the lock screen pattern changes once. In this scenario, the electronic device may start detection based on an operation of pressing the power button by the user, to determine the similarity between the foreground element and the background pattern. Alternatively, the user may trigger the change of the lock screen pattern in another manner. As long as a change of a background element is detected, the electronic device may start detection to determine the similarity between the foreground element and the background pattern. A manner of triggering the change of the lock screen pattern is not limited in the embodiments. When the electronic device detects that the foreground element differs greatly from the background pattern, the electronic device does not need to use the method provided in the embodiments. For example, the electronic device may detect the similarity between a color of the foreground element and a color of the background pattern, or a contrast between a color of the foreground element and a color of the background pattern. When the similarity between the color of the foreground element and the color of the background pattern is greater than a specific threshold, or when the contrast between the color of the foreground element and the color of the background pattern is less than a specific threshold, it may be determined that the background pattern affects display of the foreground element, and the foreground element may be processed by using the foreground element processing method provided in the embodiments.

Figure 5A:
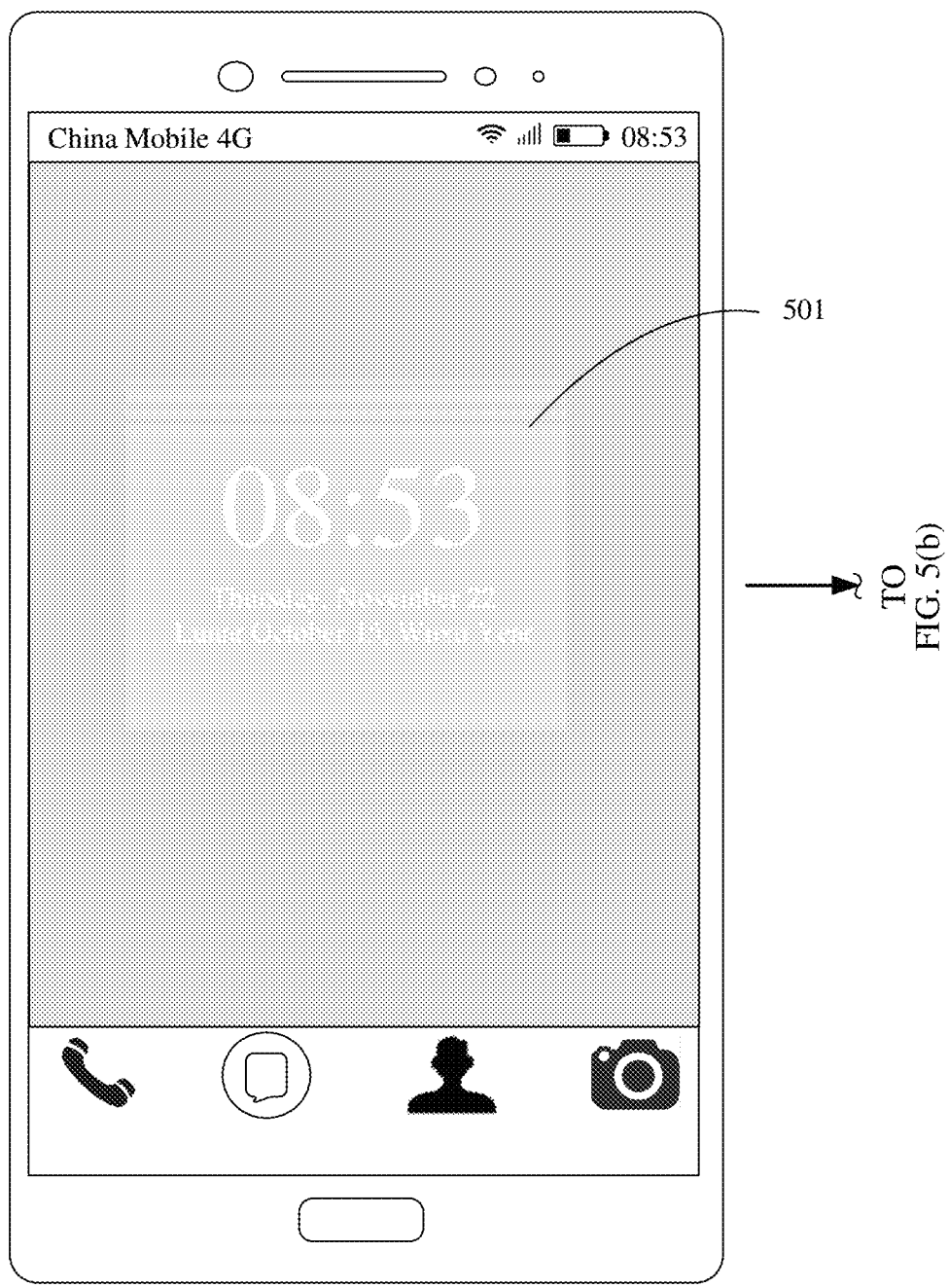
FIG. 5(a), FIG. 5(b), FIG. 5(c), and FIG. 5(d) are a schematic diagram of an example of a foreground element processing process according to an embodiment.

For example, if the background is a pure black picture, and the time, the date, the day, or the like in the foreground element is displayed in white, the electronic device determines that the contrast between the color of the foreground element and the color of the background pattern is relatively large, for example, greater than a preset threshold, and it may be determined that the background pattern has relatively slight impact on the display of the foreground element. In this case, the foreground element does not need to be processed by using the foreground element processing method provided in the embodiments. FIG. 5(a), FIG. 5(b), FIG. 5(c), and FIG. 5(d) are a schematic diagram of an example of a foreground element processing process according to an embodiment. As shown in FIG. 5(a), a foreground element 501 includes time, a date, and a day. When detecting that a similarity between the foreground element 501 and a background picture is high, for example, a color similarity is greater than a preset threshold, the electronic device extracts the foreground element 501, and performs complementary color processing on the extracted foreground element 501.

Figure 5B:
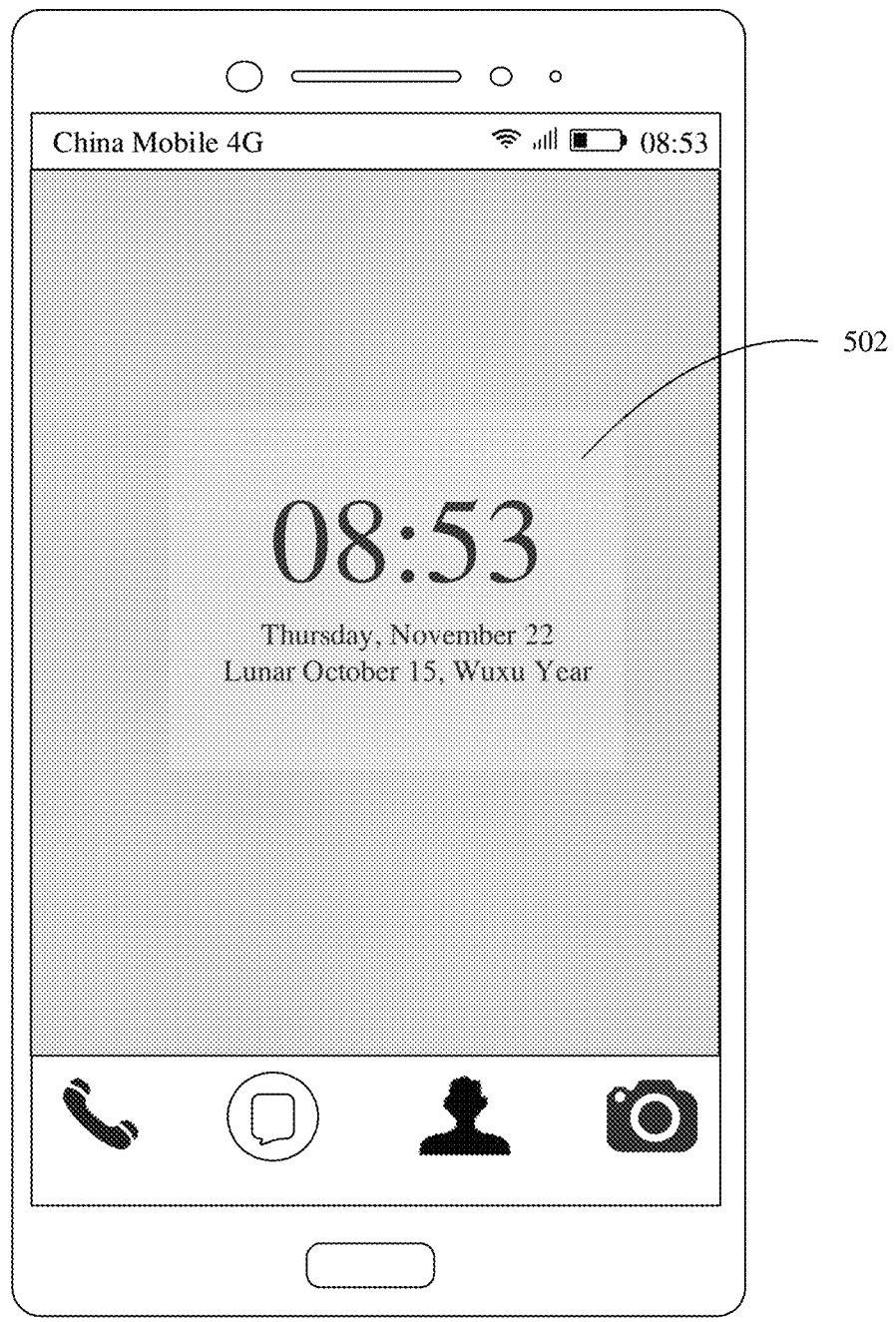

It should be understood that the complementary color processing herein is to change a color of the foreground element to an opposite color or a color with a large color difference from the original color. For example, as shown in FIG. 5(b), the foreground element 501 changes from original white to black. This is not limited in the embodiments.

Figure 5C:
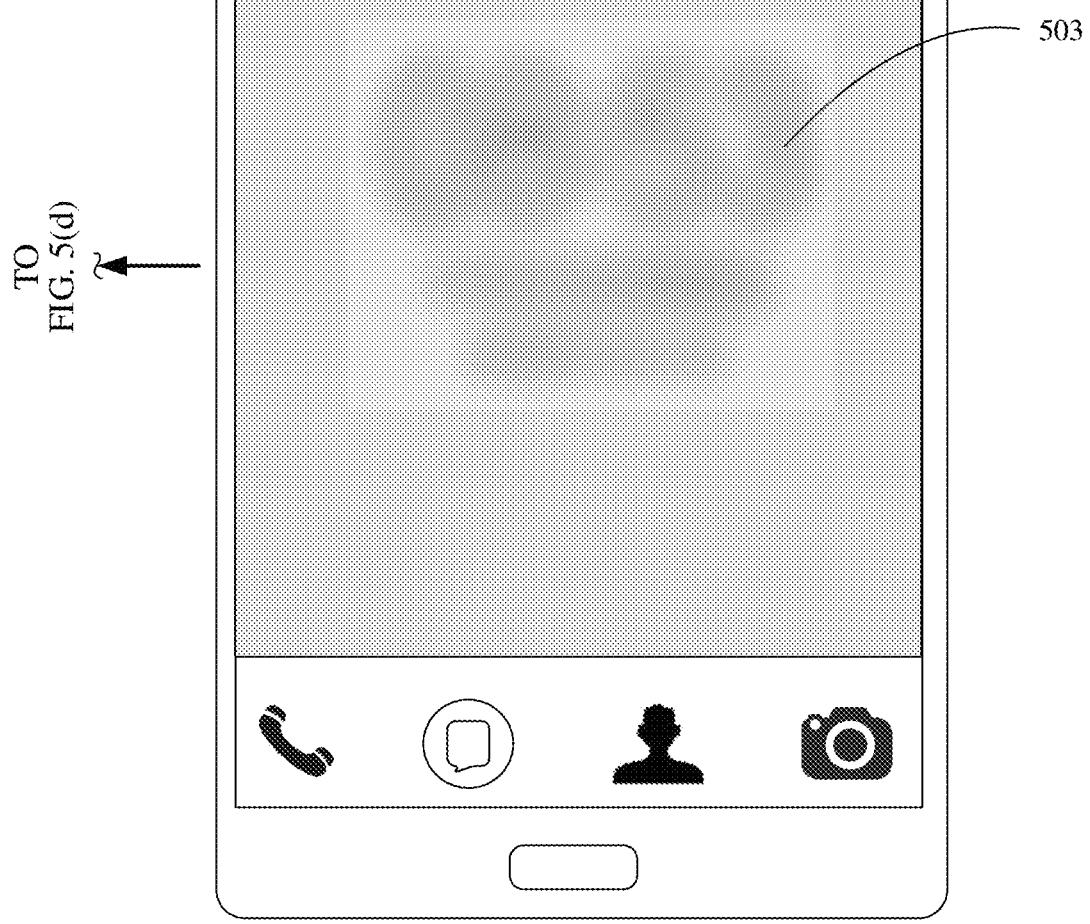

A blur processing operation is performed on a foreground element 502 obtained after the complementary color processing, as shown in FIG. 5(c). In FIG. 5(c), content of a foreground element 503 is displayed in a black and blurred state. Then, the foreground element 503 obtained after the blur processing and the foreground element 501 on which no processing is performed in FIG. 5(a) are superimposed, to obtain a foreground element 504 having a display effect shown in FIG. 5(d).

Figure 5D:
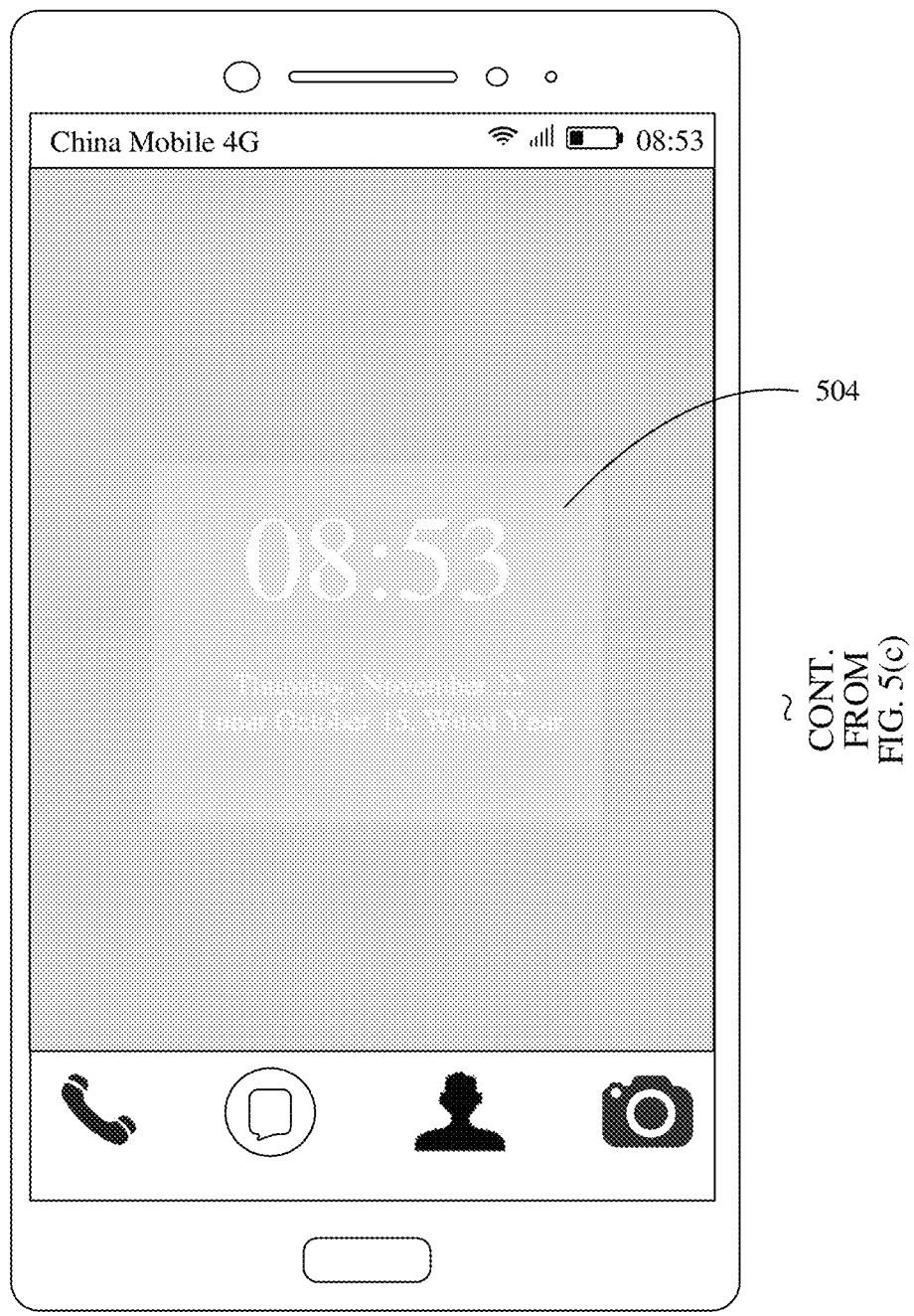

As shown in FIG. 5(d), the foreground element 504 is displayed in white, an area around the element has a black blurred shadow effect, and the black blurred shadow may enhance recognition of the foreground element. Compared with the white foreground element 501 in FIG. 5(a), the foreground element in FIG. 5(d) is clearer. This helps a user obtain information such as time and a date. In addition, no processing is performed on the background picture in this process, and a display effect of the background picture is not affected. Optionally, the blur processing operation in the embodiments may be implemented by using a blur control algorithm, for example, a Gaussian blur algorithm or a mean blur algorithm. A type of the blur control algorithm is not limited in the embodiments.

In a possible implementation, in a process of performing the blur processing operation on the foreground element, a blur degree may be adjusted based on an actual effect. For example, FIG. 6(a), FIG. 6(b), FIG. 6(c), and FIG. 6(d) are a schematic diagram of an example of foreground elements with different blur degrees according to an embodiment. As shown in FIG. 6(a), FIG. 6(b), FIG. 6(c), and FIG. 6(d), the blur degrees of the foreground elements are gradually increased from FIG. 6(a) to FIG. 6(d), where the blur degree in FIG. 6(d) is the highest.

It should be understood that, after the foreground elements with the different blur degrees and an unprocessed foreground element are superimposed, display effects are different. For example, after the foreground element with the highest blur degree shown in FIG. 6(d) and the unprocessed foreground element are superimposed, a display effect is clearer. However, a higher blur degree may indicate a larger area in which the foreground element covers the background picture. Therefore, to reduce impact on the background picture and ensure a display effect of the background picture, the electronic device may automatically adjust the blur degree based on an actual effect.

Figure 6A:
FIG. 6(a), FIG. 6(b), FIG. 6(c), and FIG. 6(d) are a schematic diagram of an example of foreground elements with different blur degrees according to an embodiment.
Figure 6B:
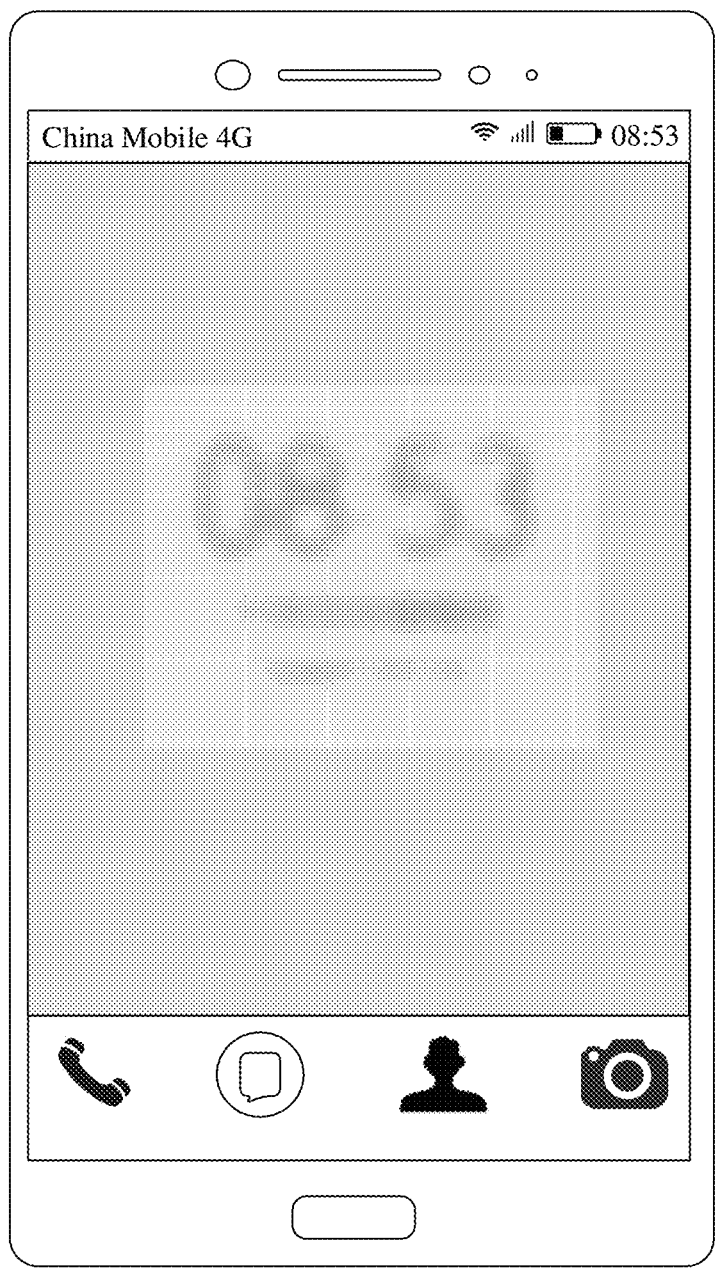
Figure 6C:
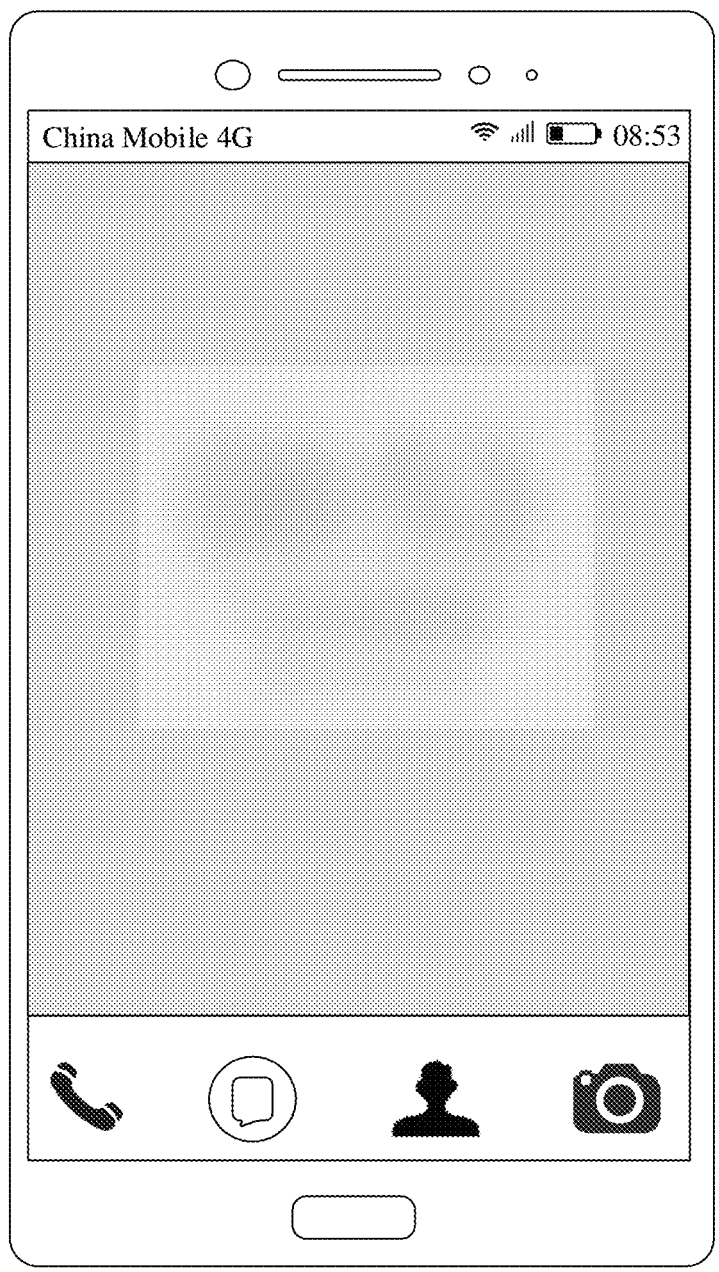
Figure 6D:
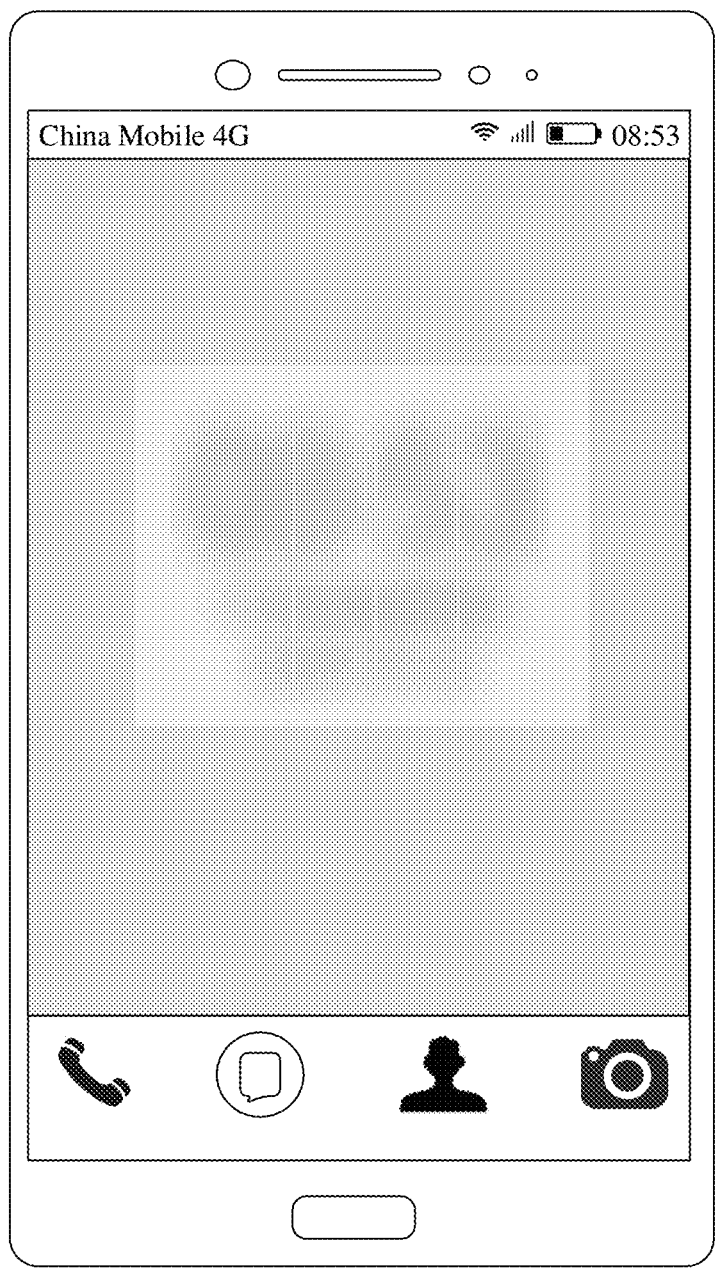

For example, after the foreground element with the blur degree shown in FIG. 6(b) and the unprocessed foreground element are superimposed, the foreground element can be clearly displayed on the background picture, and the electronic device detects that in a current display effect, a similarity between the foreground element and the background picture is less than a preset threshold. Therefore, the electronic device determines that the current blur degree can meet a current requirement. In this case, the foreground element is processed by using the blur degree shown in FIG. 6(b) as a standard, to ensure recognition of the foreground element.

It should be understood that, in the embodiments, that the foreground element is clearly displayed on the background picture may be understood as the foregoing enumerated case in which the electronic device determines, by determining a similarity between the foreground element and the background pattern or by determining a contrast between a color of the foreground element and a color of the background pattern, that the user can clearly see the foreground element currently, and obtain information about the foreground element.

For example, based on a contrast 4.6:1 of a visible color of an ordinary person, when the contrast between the color of the foreground element and the color of the background pattern is greater than 4.6, the electronic device determines that the user can clearly see the foreground element currently, that is, can obtain information included in the foreground element, for example, clearly obtain information such as time, a date, or a day. This is not limited in the embodiments. Optionally, in addition to the foregoing described fact that the electronic device automatically adjusts the blur degree based on an actual effect, participation of the user may be further introduced, and the user adjusts the blur degree. For example, the user sets the blur degree in the settings for setting a wallpaper, to achieve a display effect desired by the user. A user setting and operation process is not limited in the embodiments.

In a process in which the electronic device automatically adjusts the blur degree based on an actual effect, four blur levels may be preset. For example, a first level is a "completely non-blurred" processing effect, blur degrees at a second level and a third level are gradually enhanced, and a fourth level is a "completely blurred" processing effect.

For example, in the processing process described in FIG. 5(a) to FIG. 5(d), the blur processing in FIG. 5(c) is first performed by using the first level (the "completely non-blurred" processing effect), to achieve an effect implemented after fusion in FIG. 5(d). Then, the electronic device detects the contrast between the color of the foreground element and the color of the background picture in FIG. 5(d). When the contrast reaches a preset threshold (for example, the standard contrast 4.6), a current first-level blur processing effect meets a current requirement. Otherwise, the blur processing degree is increased to the second level, and cyclic processing is continued until the electronic device detects that the contrast between the color of the foreground element and the color of the background picture reaches the preset threshold. This is not limited in the embodiments.

In the foregoing method, a degree of blur processing on the foreground element may be adjusted in a display process of the foreground element, to adapt to different scenarios. When the foreground element or the background picture changes, the blur degree of the foreground element is adjusted in real time, to meet a current requirement and ensure a display effect of the foreground element.

It should be understood that, to describe the foregoing processing process of the foreground element, in the accompanying drawings, a change of the foreground element in the processing process is displayed on a display interface of the electronic device. In an actual application process, the electronic device may display only the final superimposed foreground element 504 shown in FIG. 5(d). In other words, a processing process of the foreground element shown in FIG. 5(b) and FIG. 5(c) is not shown on the interface of the electronic device. This is not limited in the embodiments. When the electronic device starts detection and determines that the current similarity between the background picture and the foreground element is greater than or equal to the preset threshold, it is determined that the foreground element display method in the embodiments needs to be used, and the foreground element with the effect shown in FIG. 5(d) is displayed by using the foregoing processing process.

In the foreground element display method described above, when the similarity between the foreground element and the background picture is high, the foreground element is extracted, the complementary color processing is performed on the extracted foreground element, and the blur processing is performed on the foreground element obtained after the complementary color processing. Then, the foreground element obtained after the blur processing and an original foreground element on which no processing is performed are superimposed, so that the foreground element has a clear display effect on the background picture, to ensure recognition of the foreground element and make the display effect natural. In addition, the background can be dynamically processed in real time following the change of the foreground element. In this way, an effect of the background picture is not affected. The display effect of the foreground element is natural, and the foreground element can be clearly displayed in any background pattern.

During use of the electronic device, the foreground element may change. For example, as time changes, foreground elements such as time, a date, and a day change constantly on the interface. According to the foreground element display method provided in the embodiments, dynamic processing may also be performed in real time for a constantly changing foreground element, to ensure a clear display effect of the foreground element on the background picture.

Figure 7A:
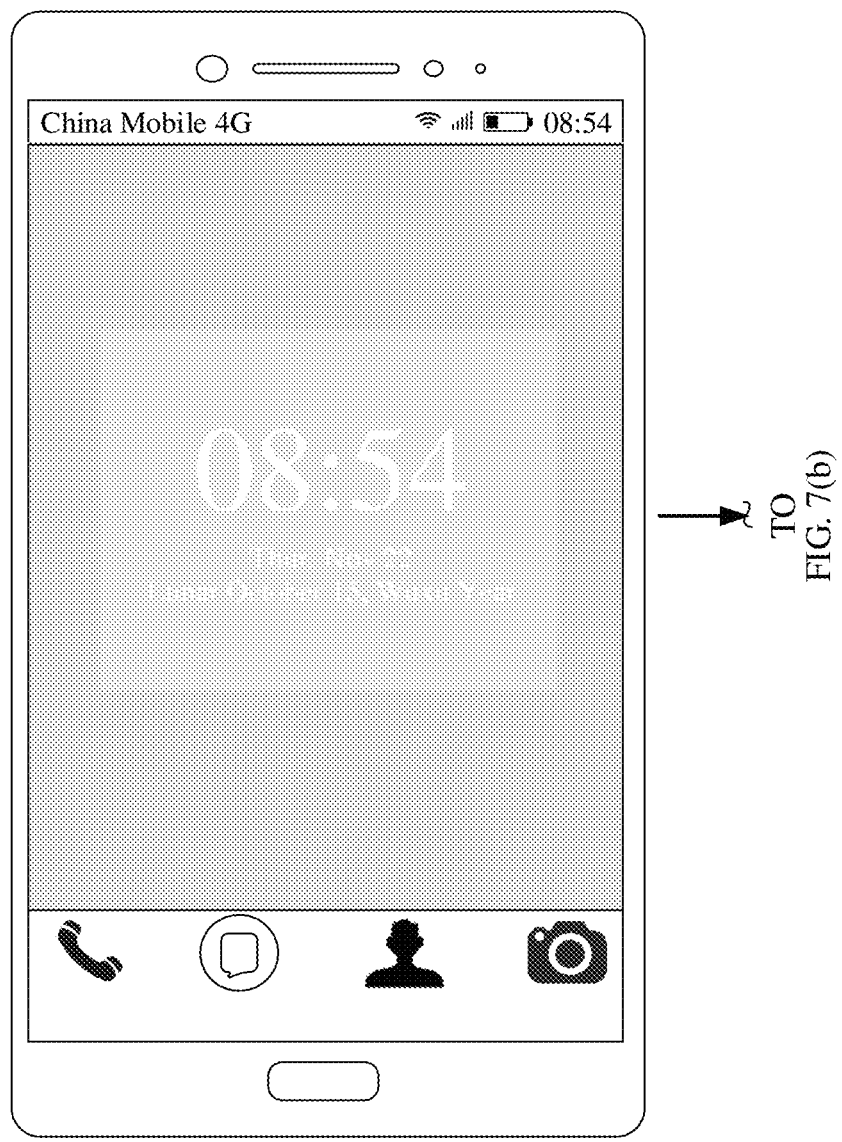
FIG. 7(a), FIG. 7(b), FIG. 7(c), and FIG. 7(d) are a schematic diagram of another example of a foreground element processing process according to an embodiment.
Figure 7B:
Figure 7C:
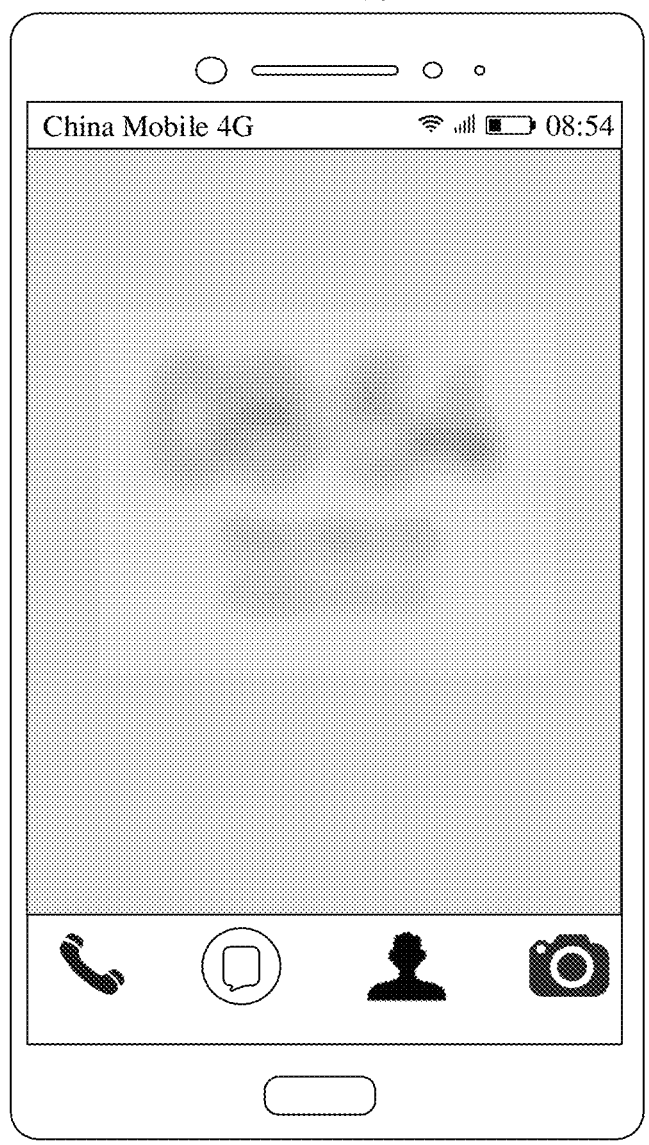
Figure 7D:

FIG. 7(a), FIG. 7(b), FIG. 7(c), and FIG. 7(d) are a schematic diagram of another example of a foreground element processing process according to an embodiment. When time of the electronic device changes from 08:53 to 08:54, and the foreground element changes, the electronic device starts the foreground element processing process in the embodiments. For example, as shown in FIG. 7(a), time, a date, and a day are displayed in white font. The electronic device extracts the white foreground element, and performs complementary color processing on the extracted foreground element, to achieve a display effect shown in FIG. 7(b), where the foreground element is displayed in black. The electronic device performs blur processing on the black foreground element, and then superimposes a foreground element obtained after the blur processing and the foreground element on which no processing is performed in FIG. 7(a), to obtain a foreground element shown in FIG. 7(d). In FIG. 7(d), the foreground element is displayed in white, an area around the element has a black blurred shadow effect, and the black blurred shadow may enhance recognition of the foreground element. Compared with the white foreground element in FIG. 7(a), the foreground element in FIG. 7(d) is clearer. This helps a user obtain information such as the time and the date. In addition, no processing is performed on a background picture in this process, and a display effect of the background picture is not affected.

It should be understood that, in addition to the foregoing enumerated foreground elements such as the time, the date, and the day, the embodiments may be further used to process names of icons of various third-party applications, for example, icons or names of applications such as Alipay and WeChat; or an element displayed on an interface may include an icon, a name, and the like of a folder created by the user. This is not limited in the embodiments.

Figure 8A:
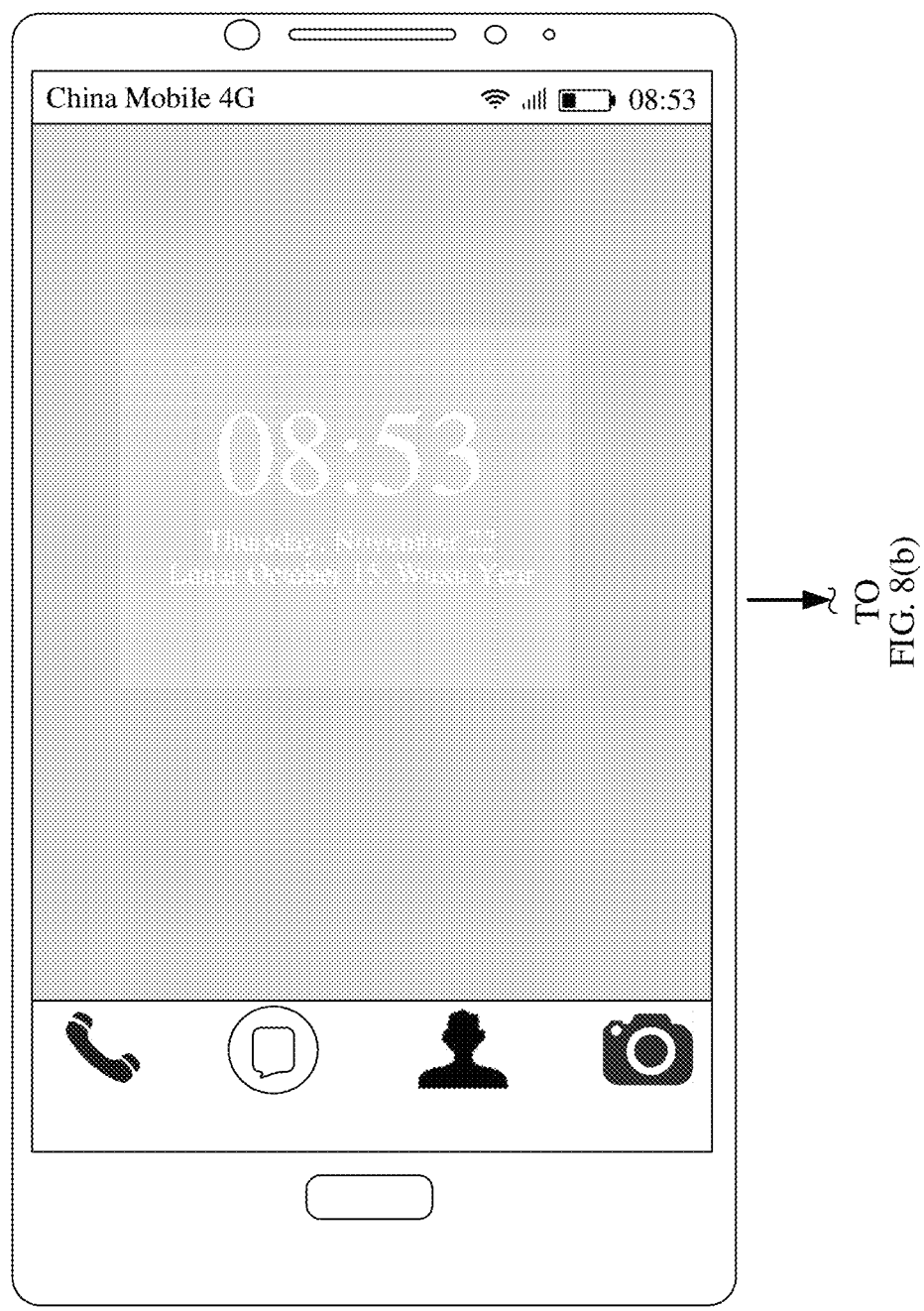
FIG. 8(a), FIG. 8(b), FIG. 8(c), and FIG. 8(d) are a schematic diagram of another example of a foreground element processing process according to an embodiment.

In the foreground element processing processes described in FIG. 5(a), FIG. 5(b), FIG. 5(c), and FIG. 5(d) to FIG. 7(a), FIG. 7(b), FIG. 7(c), and FIG. 7(d), a display area in which each element is located is used as a processing object. For example, for a processing process of "08:53", display areas in which the characters "0", "8", "5", and "3" are located are used as processing objects to perform complementary color processing. Blur processing is performed on digits obtained after the complementary color processing. Then, digits obtained after the blur processing and original digits on which no processing is performed are superimposed. In this way, the digits have a clear display effect on a background picture. FIG. 8(a), FIG. 8(b), FIG. 8(c), and FIG. 8(d) are a schematic diagram of another example of a foreground element processing process according to an embodiment. In FIG. 8(a), FIG. 8(b), FIG. 8(c), and FIG. 8(d), a foreground element processing method is described by using, as a processing object, a fixed area in which a foreground element is located. As shown in FIG. 8(a), the foreground element is not clearly displayed on a background picture. When determining that a similarity between the current foreground element and the background pattern is relatively high, or a contrast is less than a preset threshold, the electronic device obtains a display area in which the foreground element is located. It should be understood that the display area herein may be understood as an area occupied by characters "0", "8", "5", or "3".

Figure 8B:
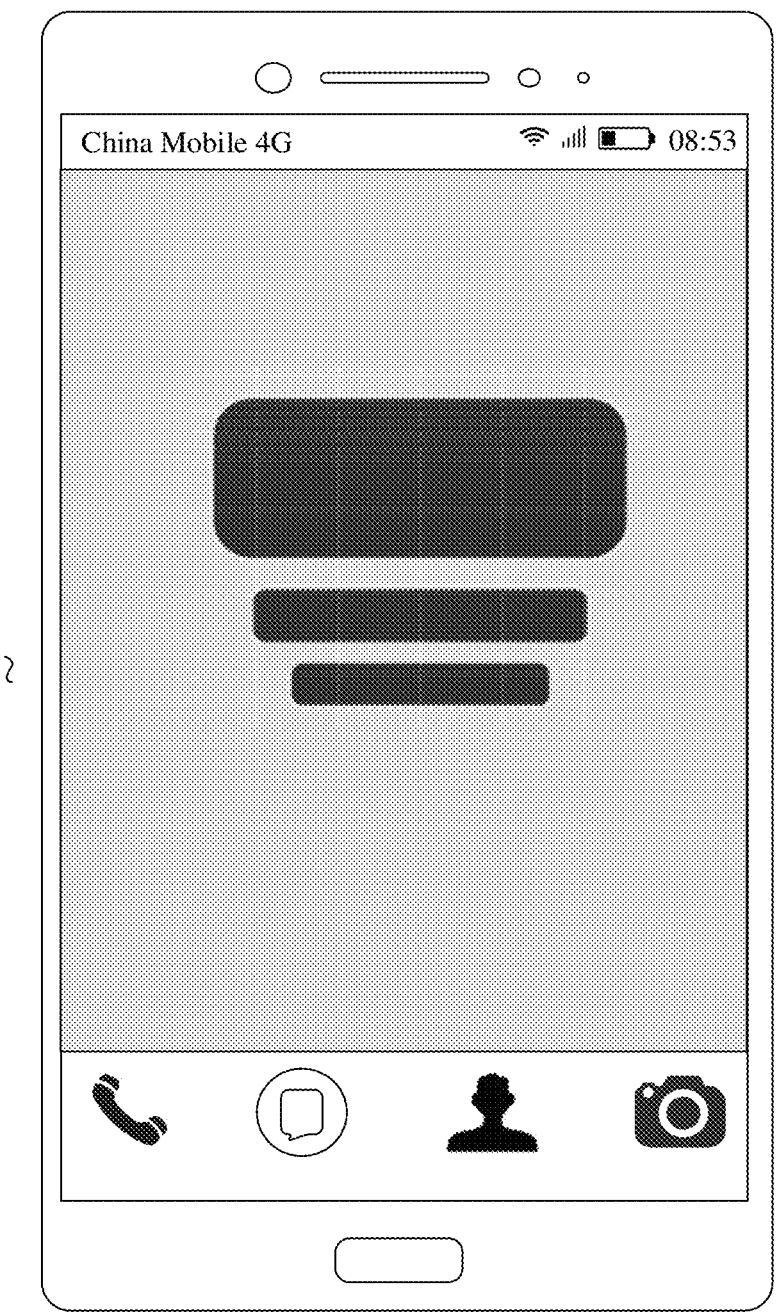

As shown in FIG. 8(b), after determining the display area in which the foreground element is located, the electronic device determines a fixed area based on the display area of the foreground element. The fixed area may be a rectangular area with a specific width and a specific height. For example, the fixed area may be three black rounded rectangular areas shown in FIG. 8(b). The fixed area is used as a processing object, and complementary color processing is performed on the entire fixed area. For example, the fixed area is displayed as a black rounded rectangular box.

It should be understood that the rectangular area herein is merely an example, and the fixed area determined by the electronic device may have different shapes, for example, an irregular shape. This is not limited in the embodiments.

Figure 8C:
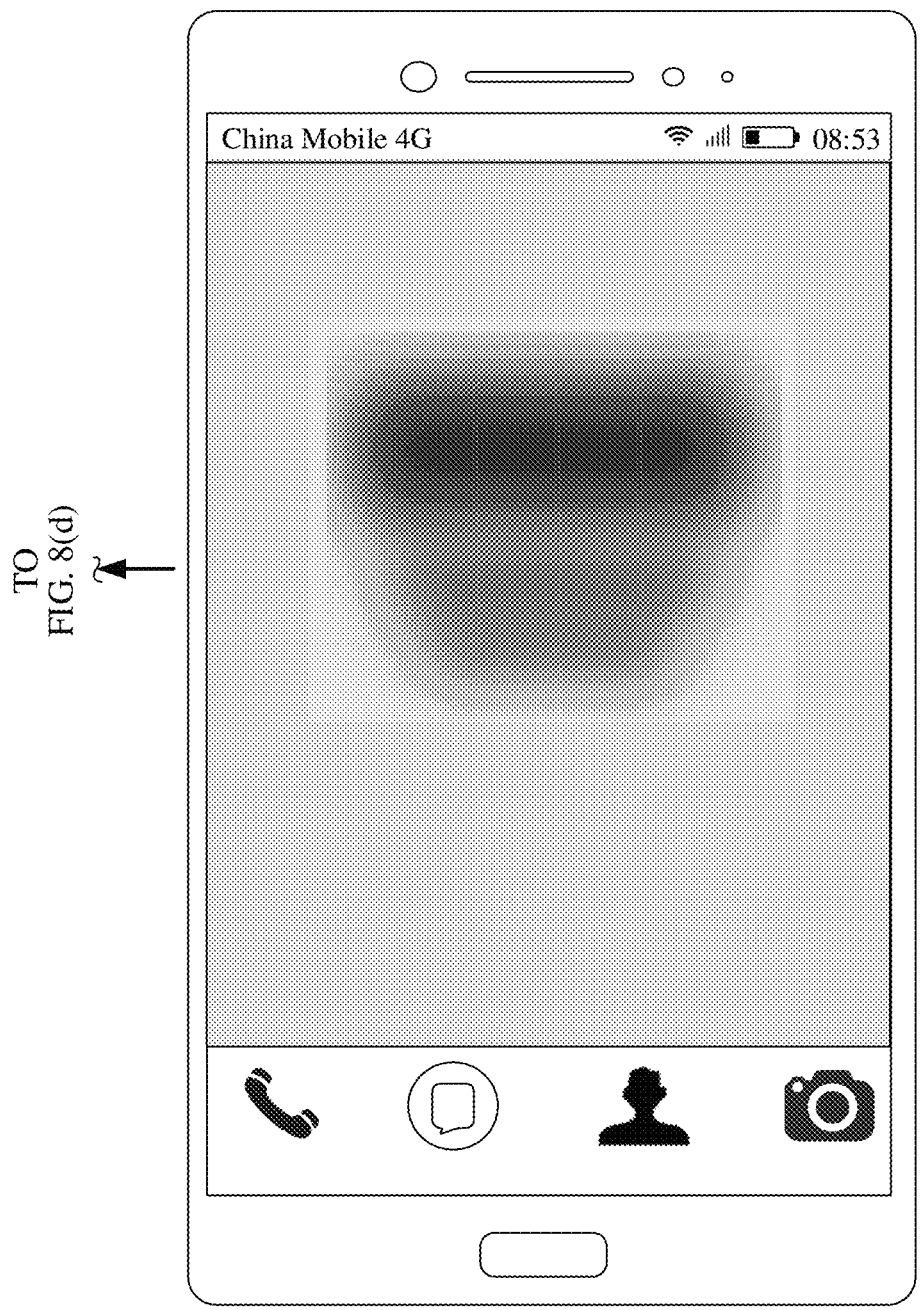

The electronic device performs a blur processing operation on the determined fixed area in FIG. 8(b), to achieve a display effect shown in FIG. 8(c). After the fixed area undergoes the blur processing, the fixed area has a blurred edge and a black display effect. Then, the fixed area obtained after the blur processing and the foreground element on which no processing is performed in FIG. 8(a) are superimposed, to obtain a foreground element having a display effect shown in FIG. 8(d).

Optionally, the blur processing operation in the embodiments may be implemented by using a blur control algorithm, for example, a Gaussian blur algorithm or a mean blur algorithm. A type of the blur control algorithm is not limited in the embodiments.

Figure 8D:

As shown in FIG. 8(d), the foreground element is displayed in white, a fixed area around the element has a black blurred shadow effect, and the black blurred shadow may enhance recognition of the foreground element. Compared with the white foreground element in FIG. 8(a), the foreground element in FIG. 8(d) is clearer. This helps a user obtain information such as time and a date, and does not affect a display effect of the background picture.

A foreground element has different display effects on different background pictures. A same foreground element displayed on different background pictures undergoes different impact of the background pictures. For example, for a time element "08:53" in the foreground element, display of a part of each digit may be affected by the background picture.

In a possible implementation, the electronic device may process a part or all of an area in which the foreground element is affected by the background picture. For example, an area in which complementary color processing and blur processing are performed and an unprocessed foreground element is superimposed is a part of an area of the foreground element.

Figure 9A:
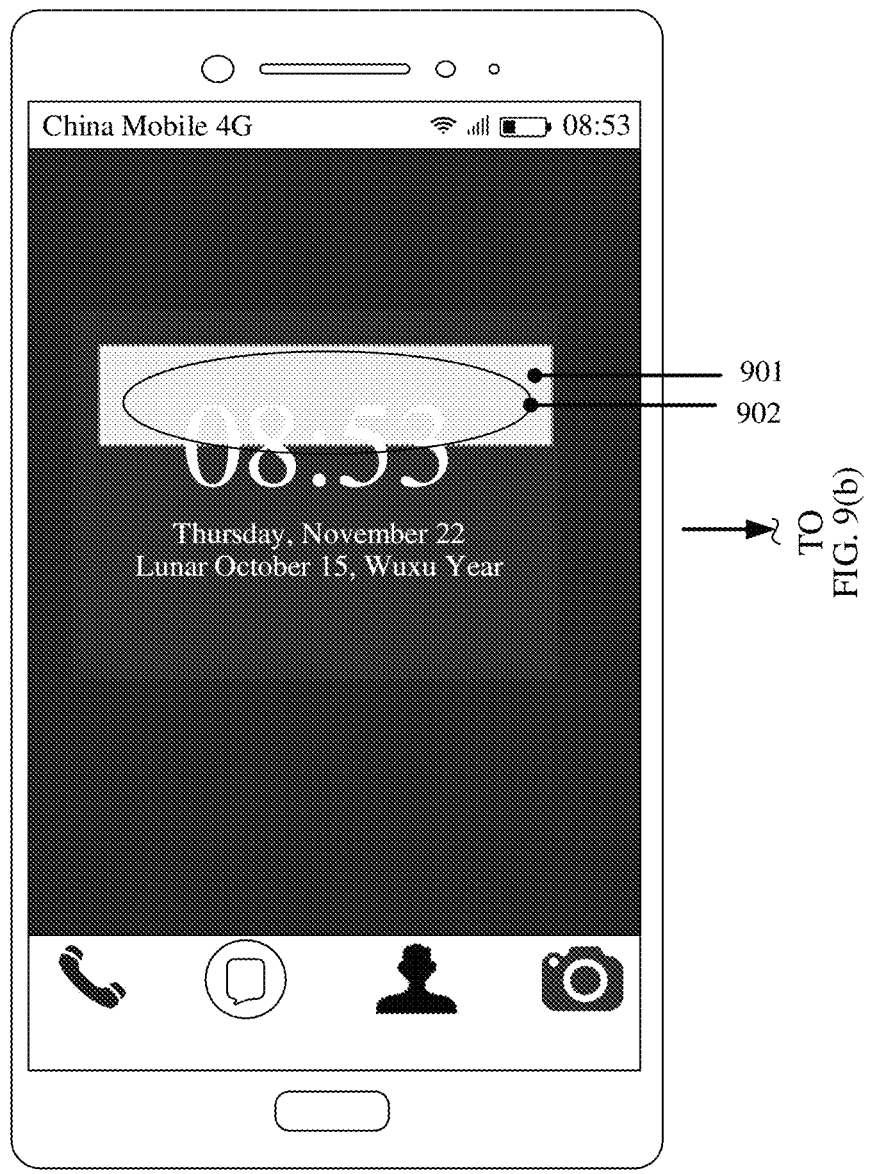
FIG. 9(a), FIG. 9(b), FIG. 9(c), and FIG. 9(d) are a schematic diagram of another example of a foreground element processing process according to an embodiment.

FIG. 9(a), FIG. 9(b), FIG. 9(c), and FIG. 9(d) are a schematic diagram of another example of a foreground element processing process according to an embodiment. For example, as shown in FIG. 9(a), a background picture area 901 affects display of a partial foreground element area 902. In a foreground element processing process, only the partial foreground element area 902 is processed.

Figure 9B:
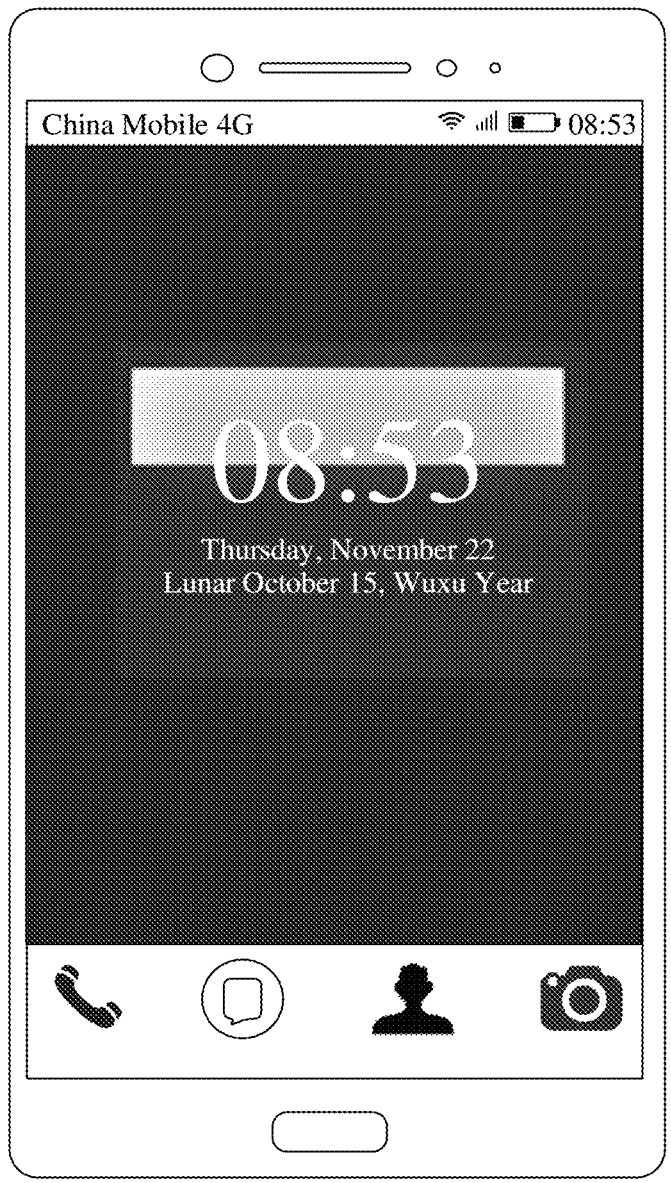

Optionally, an electronic device obtains a foreground element in the partial foreground element area 902 shown in FIG. 9(a). After complementary color processing and blur processing are performed on the partial foreground element, and an obtained partial foreground element and the unprocessed partial foreground element are superimposed, a display effect shown in FIG. 9(b) is achieved. In FIG. 9(b), the display of the partial foreground element area 902 becomes clear, and no processing is performed on a foreground element other than the partial foreground element area 902.

Figure 9C:
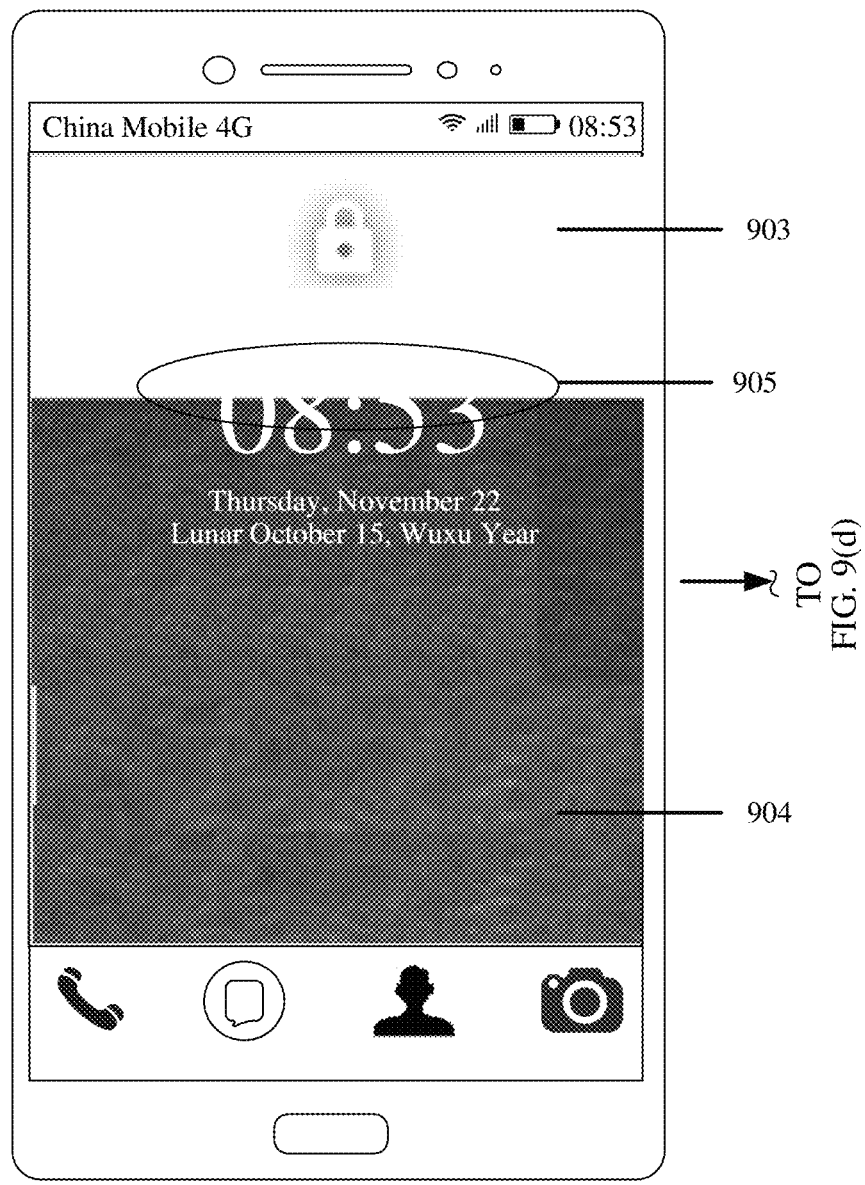
Figure 9D:
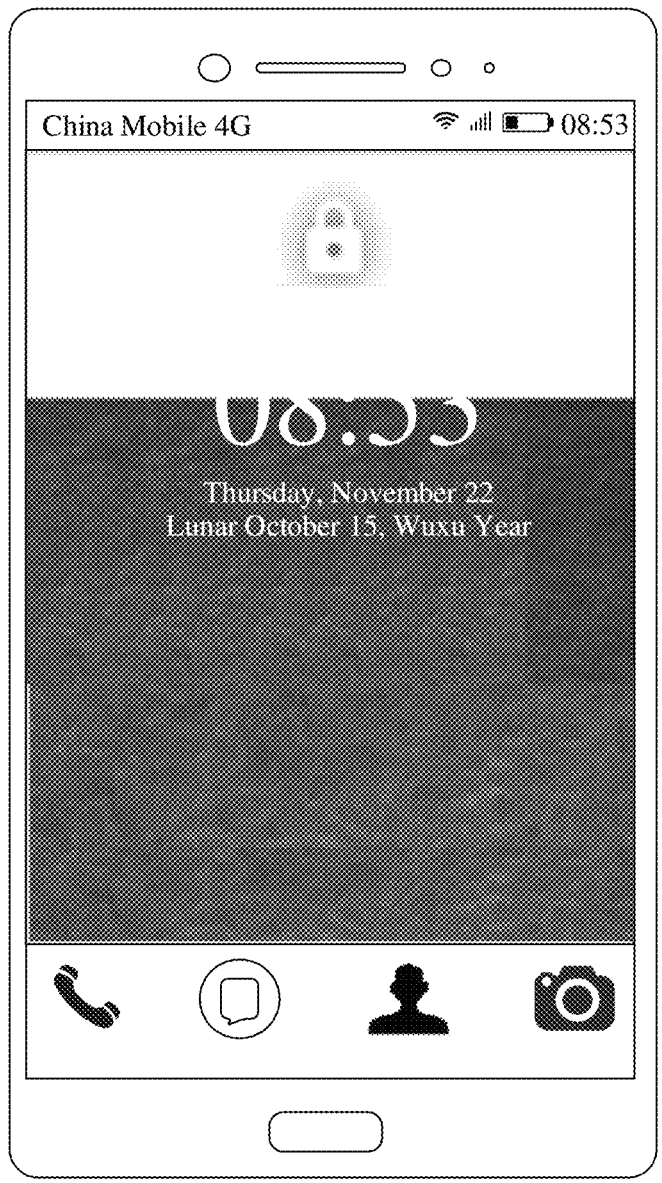

For example, in an actual application process, a background picture of the electronic device includes a light-colored area 903 (a white area) and a dark-gray area 904 (a colored area) shown in FIG. 9(c), and time and a date are used as foreground elements. An upper half area 905 of the time element overlaps the light-colored area 903, display of the upper half area 905 of the time element is affected by the light-colored area 903 of the background picture, and therefore, a user cannot obtain information in the upper half area 905. In this case, the electronic device determines that a similarity between the upper half area 905 of the time element and the light-colored area 903 of the background picture is relatively large, and the upper half area 905 of the time element may be processed by using the method provided in the embodiments.

For example, the electronic device may obtain only the upper half area 905 of the time element. After complementary color processing and blur processing are performed on the upper half area 905 of the time element, and the upper half area 905 of the time element and the unprocessed partial foreground element are superimposed, an effect shown in FIG. 9(d) may be displayed. In this case, the upper half area 905 of the time element may be clearly displayed, and the user may obtain time information of the part. It should be understood that a lock screen interface is used as an example herein. The foreground element display method provided in the embodiments may be applied to any interface, for example, an unlocked interface. This is not limited in the embodiments.

Optionally, the electronic device may further determine the fixed area based on a partial foreground element-area 802, and perform corresponding processing on the fixed area according to the method described in FIG. 8(a) to FIG. 8(d). For example, the electronic device performs corresponding processing by using a white area in FIG. 9(b) as the fixed area. This is not limited in the embodiments.

Therefore, according to the foreground element display method provided in the embodiments, the foreground element is extracted, the complementary color processing is first performed on the extracted foreground element, and then the blur processing is performed on the foreground element obtained after the complementary color processing. Finally, the foreground element obtained after the blur processing and an original foreground element on which no processing is performed are superimposed, so that the foreground element has a clear display effect on the background picture. In addition, when the foreground element changes, the method can perform the foregoing processing on the changed foreground element in real time, can perform dynamic processing on the background in real time following the change of the foreground element, and does not affect an effect of the background picture. In this way, the foreground element has a clear display effect on an interface of the electronic device. The method can ensure recognition of foreground element, so that in any background pattern, the foreground element can have a clear and natural display effect, thereby helping the user obtain information, and improving user experience.

Figure 10:
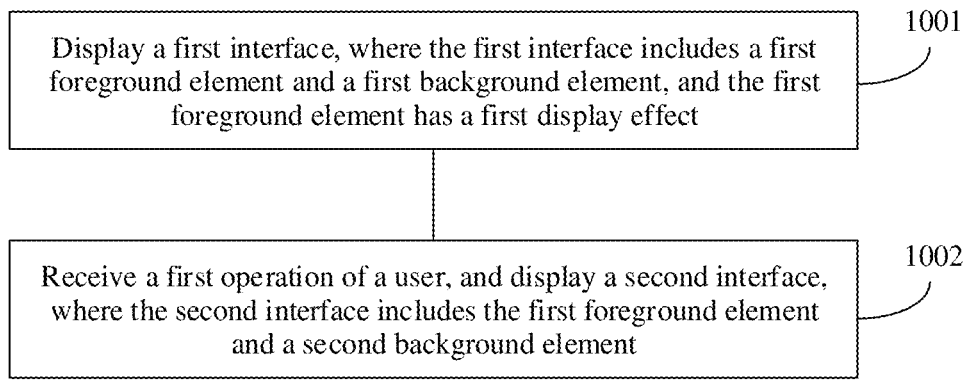
FIG. 10 is a schematic flowchart of a foreground element display method according to an embodiment.

With reference to the foregoing embodiments and related accompanying drawings, an embodiment provides a foreground element display method. The method may be implemented in the electronic device (for example, a mobile phone or a tablet computer) that has a camera and that is shown in FIG. 1 and FIG. 2. FIG. 10 is a schematic flowchart of a foreground element display method according to an embodiment. As shown in FIG. 10, the method may include the following steps.

1001: Display a first interface, where the first interface includes a first foreground element and a first background element, and the first foreground element has a first display effect.

1002: Receive a first operation of a user, and display a second interface, where the second interface includes the first foreground element and a second background element.

For example, as shown in FIG. 5(*a*), the first foreground element may be at least one of the time, the date, the weather, the icon of the application, or the name of the application on the electronic device. A time element or a date element of the electronic device is used as an example. The first display effect may be a default display effect of the electronic device or a display effect that is set by the user, for example, a color, a font, or a size for displaying the time element or the date element.

For example, the first operation may be an operation of changing a wallpaper of the electronic device by the user. As shown in FIG. 4(*a*) and FIG. 4(*b*), the wallpaper of the electronic device is changed to a wallpaper shown in FIG. 4(*b*). That is, the first background element is replaced with the second background element.

In a possible implementation, when the wallpaper of the electronic device is changed from the first background element to the second background element, the electronic device may detect a similarity between the first foreground element and the second background element. When the similarity between the first foreground element and the second background element is greater than or equal to a first preset threshold, the first foreground element has a second display effect, and the first display effect is different from the second display effect.

In another possible implementation, when a similarity between the first foreground element and the second background element is less than a first preset threshold, the first foreground element has the first display effect.

For example, the second display effect may be a display effect shown in FIG. 5(*d*), that is, a black shadow effect around the time element or the date element is added. For example, complementary color processing is sequentially performed on the time element and the date element of the electronic device to achieve a display effect shown in FIG. 5(*b*). Then, blur processing shown in FIG. 5(*c*) is performed. Finally, a time element and the date element obtained after the blur processing and the time element and the date element on which no processing is performed shown in FIG. 5(*a*) are superimposed, to achieve the second display effect shown in FIG. 5(*d*).

In another possible implementation, the electronic device may further receive a second operation of the user, and display a third interface. The third interface includes a second foreground element and the first background element; and when a similarity between the second foreground element and the first background element is greater than or equal to the first preset threshold, the second foreground element has the second display effect; or when a similarity between the second foreground element and the first background element is less than the first preset threshold, the second foreground element has the first display effect.

For example, the second operation may be an operation of changing display of the foreground element of the electronic device by the user. As shown in FIG. 4(*a*) and FIG. 4(*c*), the font of the time element or the date element of the electronic device is changed to English shown in FIG. 4(*c*). That is, the first foreground element is changed to the second foreground element, and the wallpaper of the electronic device does not change.

In a possible implementation, when the wallpaper of the electronic device is changed from the first foreground element to the second foreground element, the electronic device may detect a similarity between the second foreground element and the first background element. When the similarity between the second foreground element and the first background element is greater than or equal to the first preset threshold, the second foreground element has the second display effect.

In another possible implementation, when the similarity between the second foreground element and the first background element is less than the first preset threshold, the first foreground element has the first display effect.

For example, the second display effect may be a display effect shown in FIG. 7(*d*), that is, a black shadow effect around the time element or the date element is added. For example, complementary color processing is sequentially performed on the time element and the date element of the electronic device to achieve a display effect shown in FIG. 7(*b*). Then, blur processing shown in FIG. 7(*c*) is performed. Finally, a time element and the date element obtained after the blur processing and the time element and the date element on which no processing is performed shown in FIG. 7(*a*) are superimposed, to achieve the second display effect shown in FIG. 7(*d*).

Optionally, the first background element and the second background element may be wallpapers of the electronic device in a screen-locked state or wallpapers of the electronic device in a screen-unlocked state.

In some possible implementations, in addition to the time element and the date element, the first foreground element and the second foreground element each may be weather, an icon of an application, a name of an application, and the like on a display interface of the electronic device. This is not limited in the embodiments.

It should be understood that, when the user changes the wallpaper of the electronic device, or changes display of a font or a language setting of a foreground element such as time or a date, the electronic device starts detection to determine the similarity between the foreground element and the background pattern. Impact of the background pattern on the foreground element changes. In this case, the electronic device may start detection to re-determine a similarity between the foreground element and the background pattern. Only when the similarity between the foreground element and the background pattern is high, the foreground element display method provided in the embodiments is used.

In addition, when the electronic device is in a screen-locked state, the background pattern is a lock screen pattern. The lock screen pattern of the electronic device may be set to a continuously changing state. For example, if the user presses a power button once but does not unlock the electronic device, the lock screen pattern changes once. In this scenario, the electronic device may start detection by pressing the power button by the user, and determine the similarity between the foreground element and the background pattern. Alternatively, the user may trigger the change of the lock screen pattern in another manner. As long as a change of the background element is detected, the electronic device may start detection to determine the similarity between the foreground element and the background pattern. A manner of triggering the change of the lock screen pattern is not limited in the embodiments.

When the electronic device detects that the foreground element differs greatly from the background pattern, the electronic device does not need to use the method provided in the embodiments. For example, the electronic device may detect the similarity between a color of the foreground element and a color of the background pattern, or a contrast between a color of the foreground element and a color of the background pattern. When the similarity between the color of the foreground element and the color of the background pattern is greater than a specific threshold, or when the contrast between the color of the foreground element and the color of the background pattern is less than a specific threshold, it may be determined that the background pattern affects display of the foreground element, and the foreground element may be processed by using the foreground element processing method provided in the embodiments.

In the foreground element display method described above, when the similarity between the foreground element and the background picture is high, the foreground element is extracted, the complementary color processing is performed on the extracted foreground element, and the blur processing is performed on the foreground element obtained after the complementary color processing. Then, the foreground element obtained after the blur processing and an original foreground element on which no processing is performed are superimposed, so that the foreground element has a clear display effect on the background picture, to ensure recognition of the foreground element and make the display effect natural. In addition, the background can be dynamically processed in real time following the change of the foreground element. In this way, an effect of the background picture is not affected. The display effect of the foreground element is natural, and the foreground element can be clearly displayed in any background pattern.

It may be understood that, to implement the foregoing functions, the electronic device includes corresponding hardware and/or software modules for executing the functions. With reference to algorithm steps of each example described in the embodiments, the embodiments may be implemented in a hardware form or in a form of combining hardware with computer software. Whether a function is performed by hardware or hardware driven by computer software depends on particular applications and design constraints of the solutions. A person of ordinary skill in the art may use different methods to implement the described functions for each particular application with reference to the embodiments, but it should not be considered that the implementation goes beyond the scope of the embodiments.

In the embodiments, the electronic device may be divided into function modules based on the example in the foregoing method. For example, each function module corresponding to each function may be obtained through division, or two or more functions may be integrated into one processing module. The integrated module may be implemented in a form of hardware. It should be noted that, in this embodiment, module division is an example, and is merely a logical function division. In actual implementation, another division manner may be used.

Figure 11:
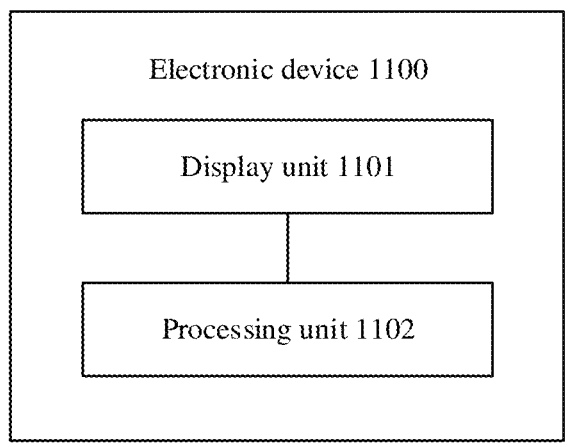
FIG. 11 is a schematic diagram of composition of an example of an electronic device according to an embodiment.

When each function module corresponding to each function is obtained through division, FIG. 11 is a schematic diagram of possible composition of an electronic device 1100 in the foregoing embodiments. As shown in FIG. 11, the electronic device 1100 may include a display unit 1101 and a processing unit.

The display unit 1101 may be configured to support the electronic device 1100 in performing the steps 1001, 1002, and the like, and/or another process used for the technology described herein.

The processing unit 1102 may be configured to support the electronic device 1100 in performing the foregoing described process of determining a contrast or a similarity between a foreground element and a background element, to control a display effect or the like of the display unit, and/or another process of the technology described herein.

It should be noted that all related content of the steps in the foregoing method embodiments may be cited in function descriptions of corresponding function modules. Details are not described herein again.

The electronic device provided in this embodiment is configured to perform the foreground element display method. Therefore, an effect same as the effect of the foregoing implementation methods can be achieved.

When an integrated unit is used, the electronic device may include a processing module, a storage module, and a communications module. The processing module may be configured to control and manage actions of the electronic device, for example, may be configured to support the electronic device in performing the steps performed by the display unit 1101 and the processing unit 1102. The storage module may be configured to support the electronic device in storing program code, data, and the like. The communications module may be configured to support communication between the electronic device and another device.

The processing module may be a processor or a controller. The processor may implement or execute various example logical blocks, modules, and circuits described with reference to content described in the embodiments. Alternatively, the processor may be a combination of processors implementing a computing function, for example, a combination of one or more microprocessors, or a combination of a digital signal processor (DSP) and a microprocessor. The storage module may be a memory. The communications module may be a device that interacts with another electronic device, such as a radio frequency circuit, a Bluetooth chip, or a Wi-Fi chip.

In an embodiment, when the processing module is a processor and the storage module is a memory, the electronic device in this embodiment may be a device in the structure shown in FIG. 1.

An embodiment further provides a computer storage medium. The computer storage medium stores computer instructions. When the computer instructions are run on an electronic device, the electronic device is enabled to perform the related method steps, to implement the foreground element display method in the foregoing embodiments.

An embodiment further provides a computer program product. When the computer program product is run on a computer, the computer is enabled to perform the foregoing related steps, to implement the foreground element display method in the foregoing embodiments.

In addition, an embodiment further provides an apparatus. The apparatus may be a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the foreground element display method in the foregoing method embodiments.

The electronic device, the computer storage medium, the computer program product, or the chip provided in the embodiments is configured to perform the corresponding method provided above. Therefore, for effects that can be achieved, refer to the effects in the corresponding method provided above. Details are not described herein again.

The foregoing descriptions about implementations allow a person of ordinary skill in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the solutions in the embodiments essentially, or the part contributing to the conventional technology, or all or some of the solutions may be implemented in the form of a software product. The software product is stored in a storage medium and includes several instructions for instructing a device (which may be a single-chip microcomputer, a chip, or the like) or a processor to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the embodiments, but are not limiting. Any variation or replacement readily figured out by a person of ordinary skill in the art within the scope disclosed in the embodiments.

What is claimed is:

1. A foreground element display method, applied to an electronic device, the method comprising:
   displaying a first interface, the first interface comprising a first foreground element and a first background element, and the first foreground element has a first display effect; and
   receiving a first operation of a user and displaying a second interface, the second interface comprising the first foreground element and a second background element; and,
   when a similarity between the first foreground element and the second background element is greater than or equal to a first preset threshold, the first foreground element has a second display effect, and the first display effect is different from the second display effect; or
   when the similarity between the first foreground element and the second background element is less than the first preset threshold, the first foreground element has the first display effect;
   receiving a second operation of the user and displaying a third interface, the third interface comprising a second foreground element and the first background element; and
   when a similarity between the second foreground element and the first background element is greater than or equal to the first preset threshold, the second foreground element has the second display effect different from the first display effect; or
   when the similarity between the second foreground element and the first background element is less than the first preset threshold, the second foreground element has the first display effect different from the second display effect;
   wherein displaying of the first foreground element in the second display effect is performed by performing both real-time complementary color processing and blur processing.

2. The method according to claim 1, wherein the first background element and the second background element are wallpapers of the electronic device in a screen-locked state or wallpapers of the electronic device in a screen-unlocked state.

3. The method according to claim 1, wherein the first foreground element and the second foreground element each are at least one of time, a date, weather information, an icon of an application, and a name of an application.

4. An electronic device, comprising one or more processors, one or more memories, a plurality of applications, and one or more programs, wherein the one or more programs are stored in the memory, and when the one or more programs are executed by the processor, the electronic device is enabled to perform the following steps:
   displaying a first interface, the first interface comprising a first foreground element and a first background element, and the first foreground element has a first display effect; and
   a first operation of a user and displaying a second interface, the second interface comprising the first foreground element and a second background element; and
   when a similarity between the first foreground element and the second background element is greater than or equal to a first preset threshold, the first foreground element has a second display effect, and the first display effect is different from the second display effect; or
   when the similarity between the first foreground element and the second background element is less than the first preset threshold, the first foreground element has the first display effect;
   receiving a second operation of the user and displaying a third interface, wherein the third interface comprises a second foreground element and the first background element; and when a similarity between the second foreground element and the first background element is greater than or equal to the first preset threshold, the second foreground element has the second display effect; or when the similarity between the second foreground element and the first background element is less than the first preset threshold, the second foreground element has the first display effect;

wherein displaying of the first foreground element in the second display effect is performed by performing both real-time complementary color processing and blur processing.

5. The electronic device according to claim 4, wherein the first background element and the second background element are wallpapers of the electronic device in a screen-locked state or wallpapers of the electronic device in a screen-unlocked state.

6. The electronic device according to claim 4, wherein the first foreground element and the second foreground element each are at least one of time, a date, weather information, an icon of an application, and a name of an application.

7. A non-transitory computer storage medium, comprising computer instructions, wherein when the computer instructions are run on an electronic device, the electronic device is enabled to perform:

displaying a first interface, the first interface comprising a first foreground element and a first background element, and the first foreground element has a first display effect; and a first operation of a user and displaying a second interface, the second interface comprising the first foreground element and a second background element; and when a similarity between the first foreground element and the second background element is greater than or equal to a first preset threshold, the first foreground element has a second display effect, and the first display effect is different from the second display effect; or when the similarity between the first foreground element and the second background element is less than the first preset threshold, the first foreground element has the first display effect;

receiving a second operation of the user and displaying a third interface, wherein the third interface comprises a second foreground element and the first background element; and when a similarity between the second foreground element and the first background element is greater than or equal to the first preset threshold, the second foreground element has the second display effect; or when the similarity between the second foreground element and the first background element is less than the first preset threshold, the second foreground element has the first display effect;

wherein displaying of the first foreground element in the second display effect is performed by performing both real-time complementary color processing and blur processing.

8. The non-transitory computer storage medium according to claim 7, wherein the first background element and the second background element are wallpapers of the electronic device in a screen-locked state or wallpapers of the electronic device in a screen-unlocked state.

9. The non-transitory computer storage medium according to claim 7, wherein the first foreground element and the second foreground element each are at least one of time, a date, weather information, an icon of an application, and a name of an application.

* * * * *